Sept. 16, 1958 A. M. GESSLER 2,852,486
PROCESS OF HEAT-REACTING BUTYL RUBBER AND AN
OXY-CARBON BLACK, PRODUCT OBTAINED THEREBY
AND VULCANIZED PRODUCT OF SAME
Filed Dec. 1, 1951 16 Sheets-Sheet 8
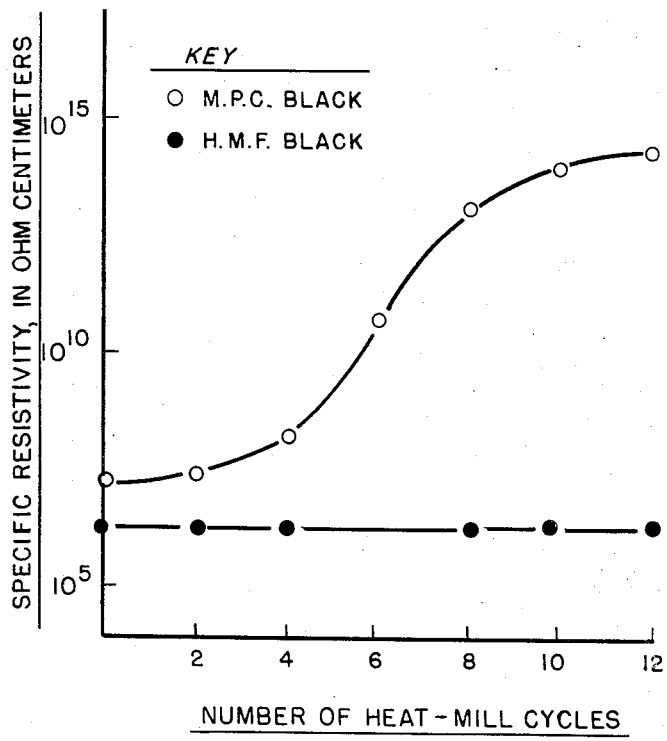

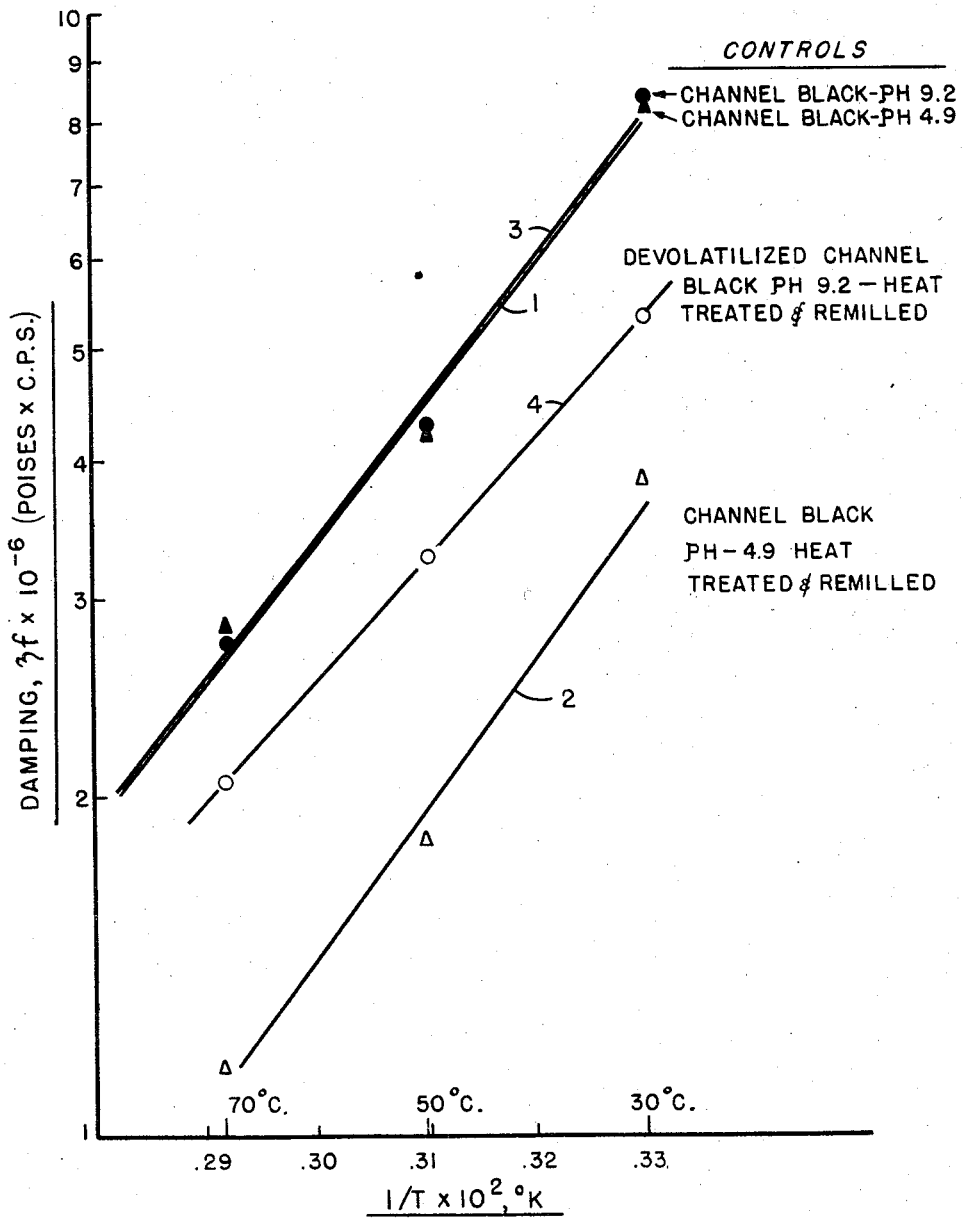

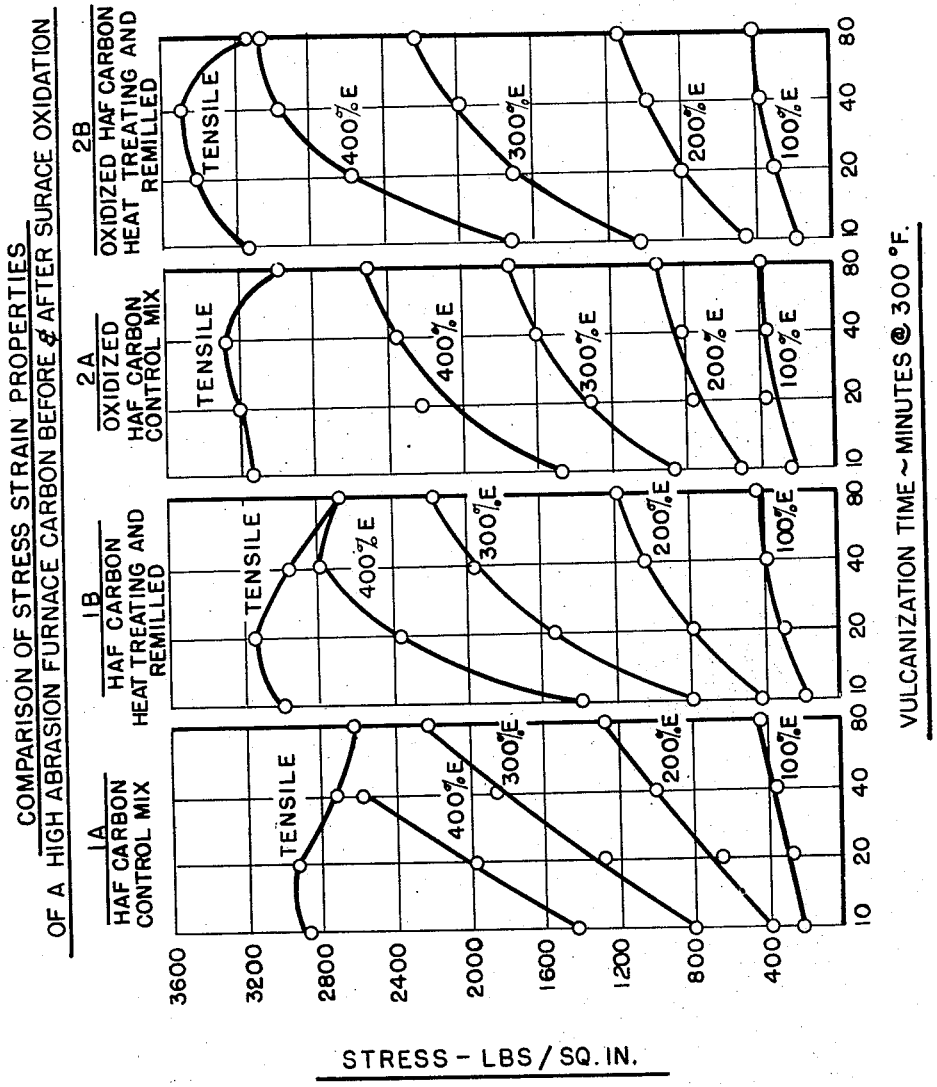

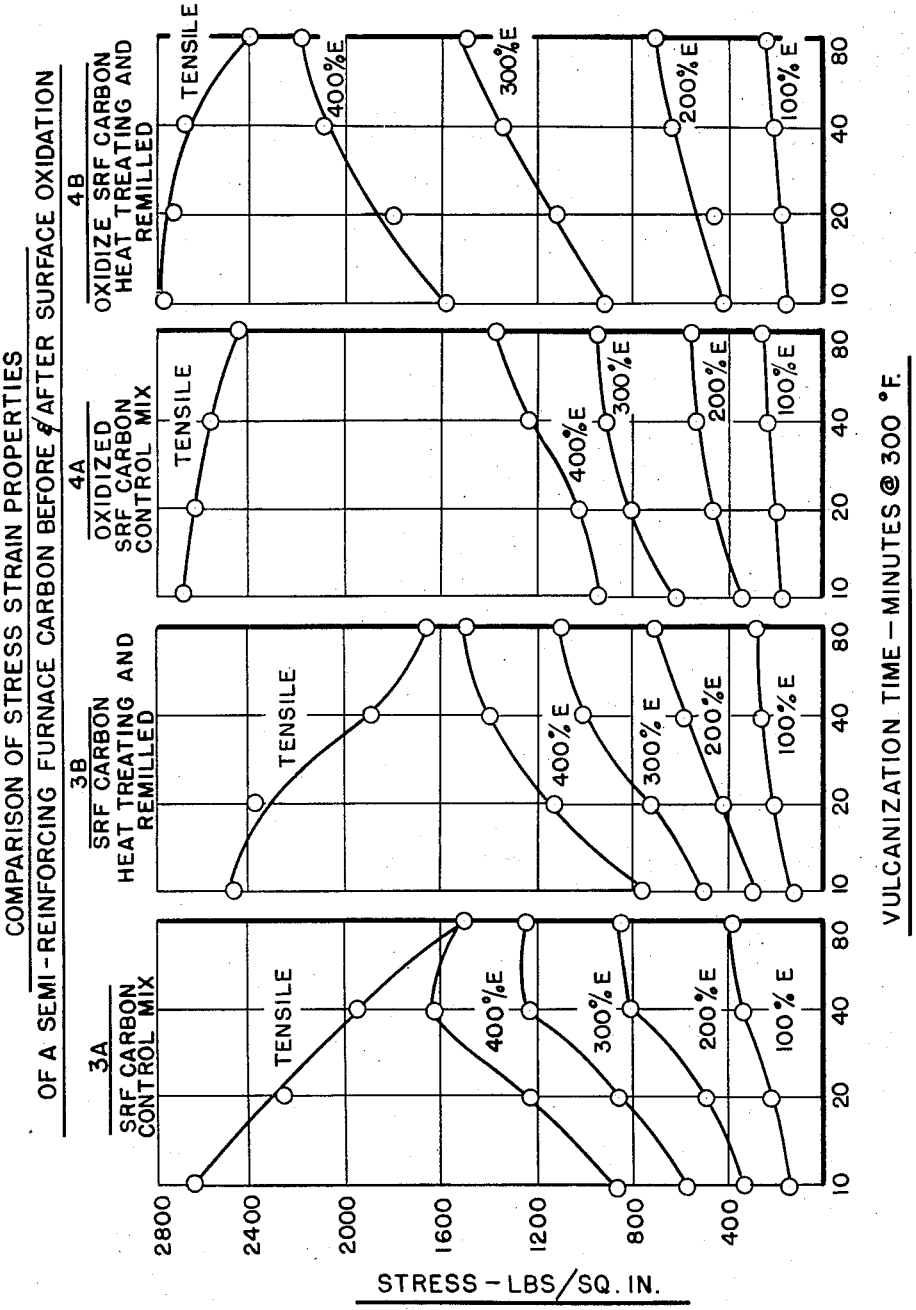

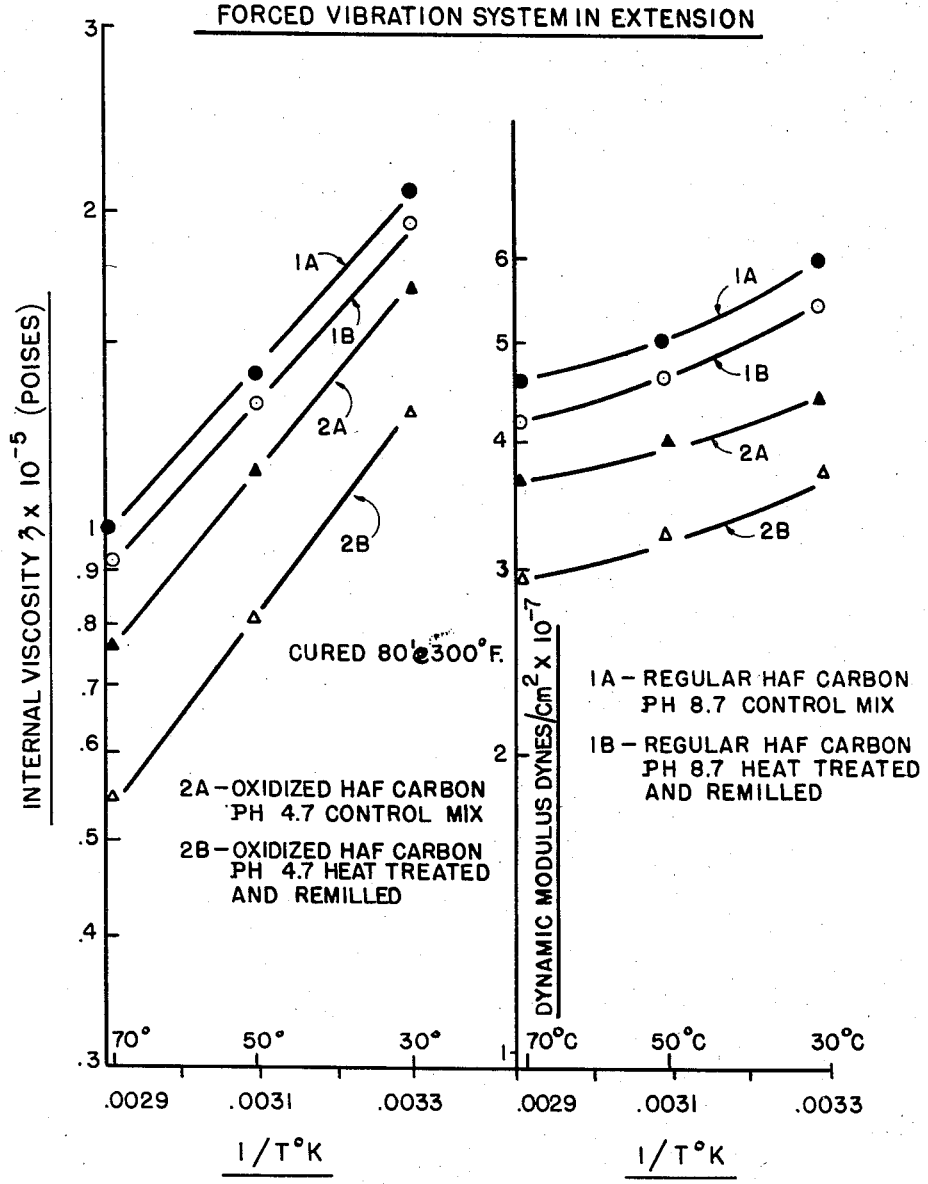

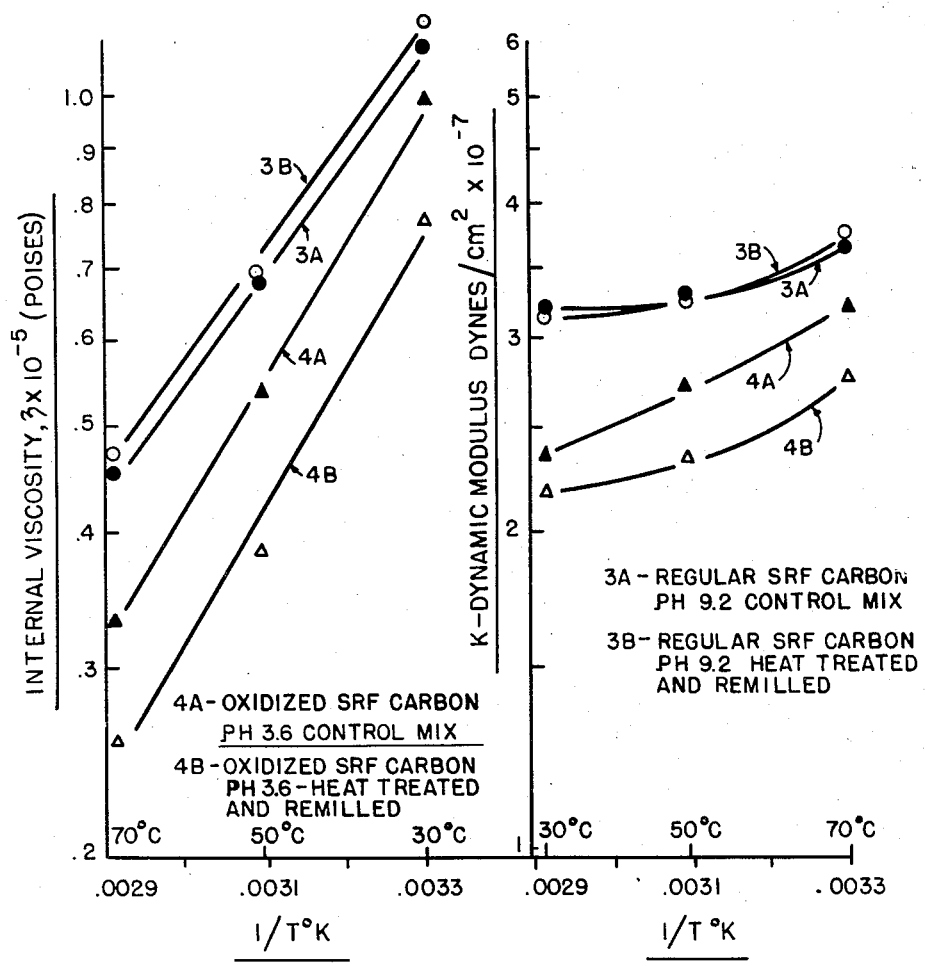

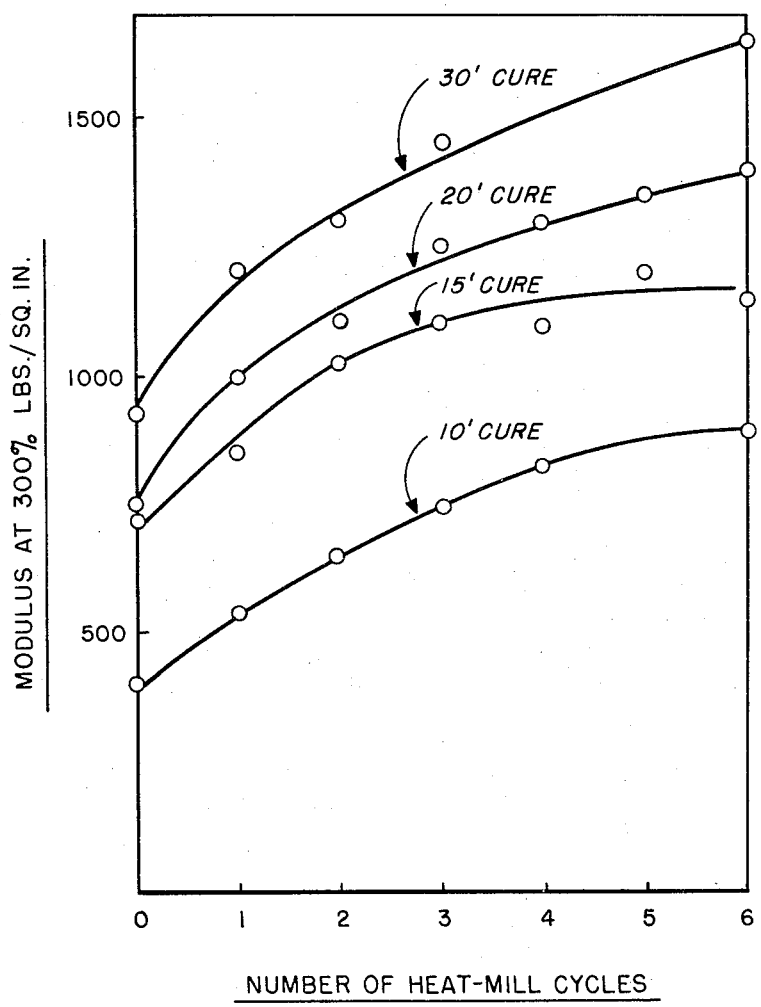

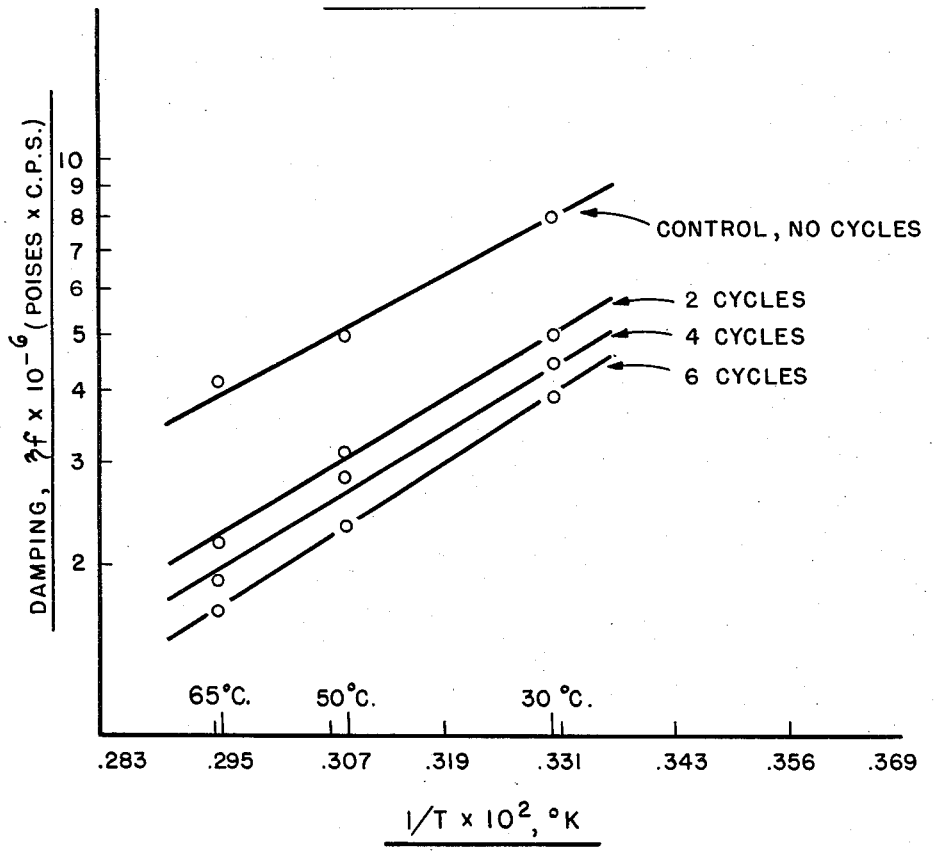

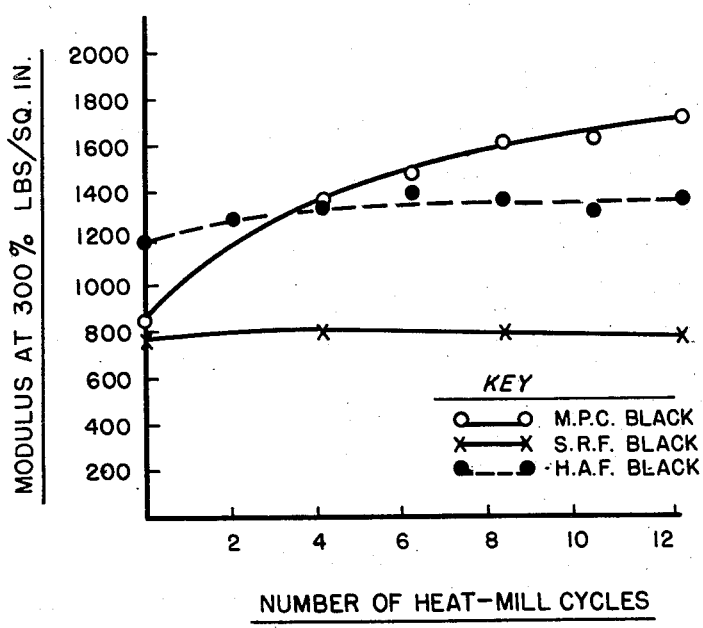

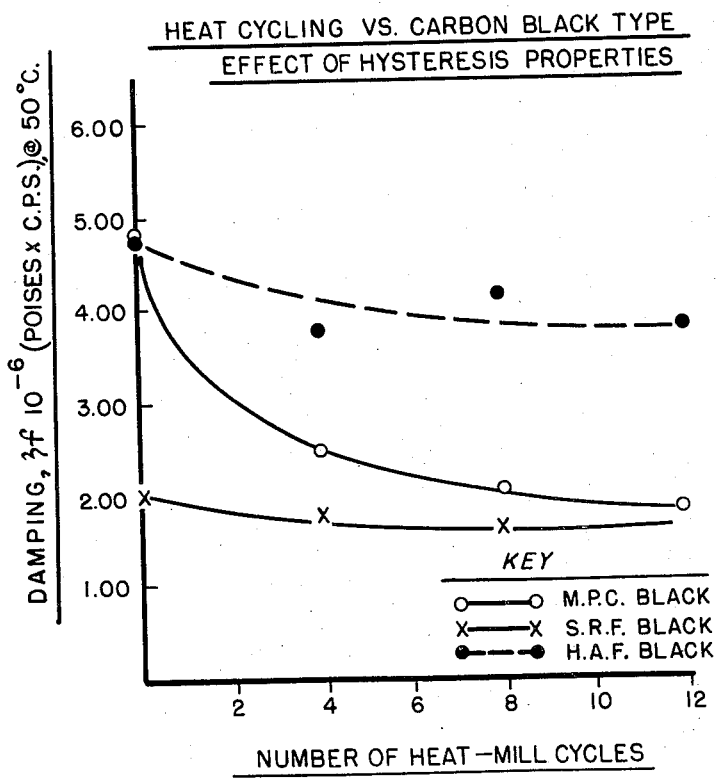

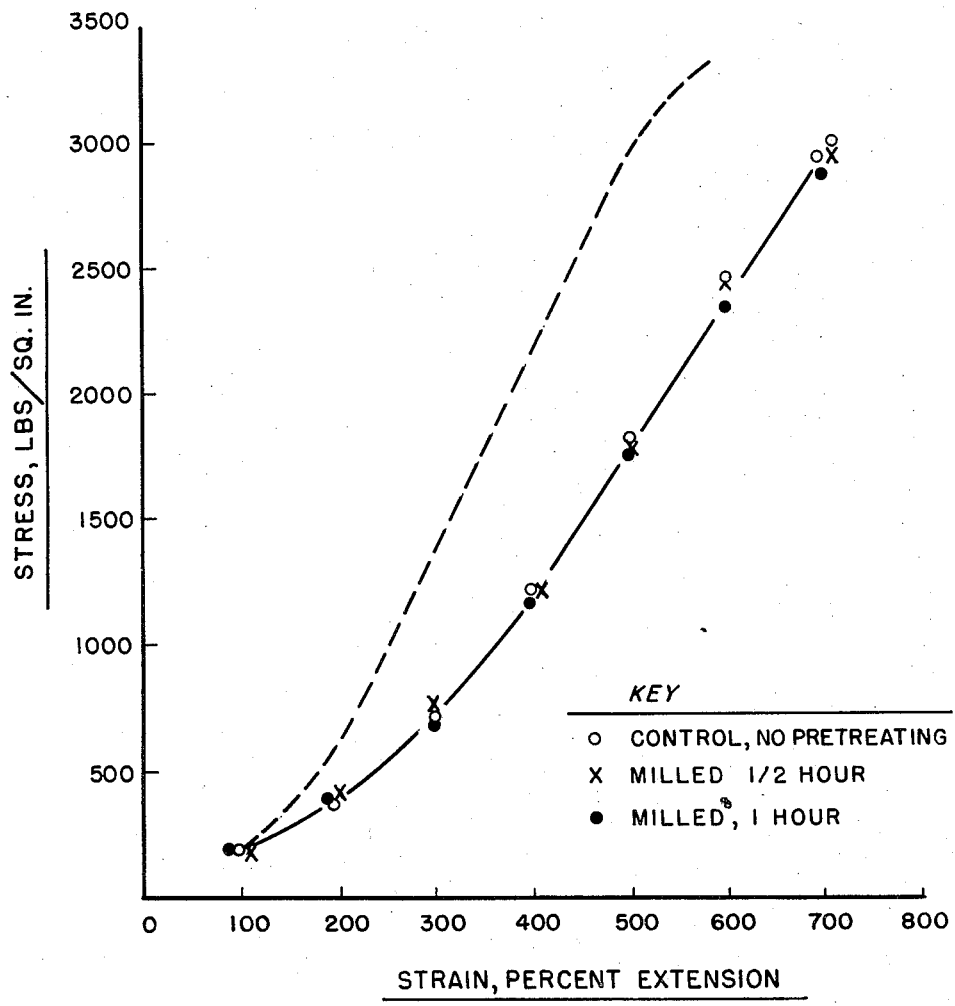

FIG. XII
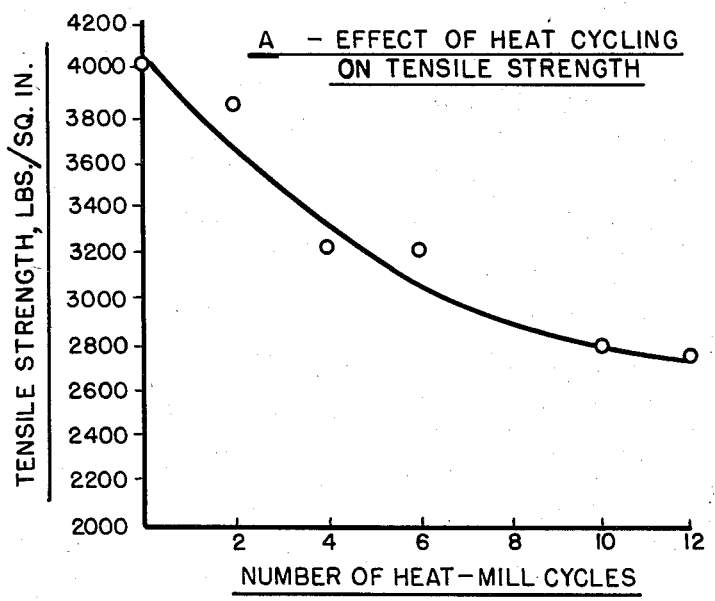
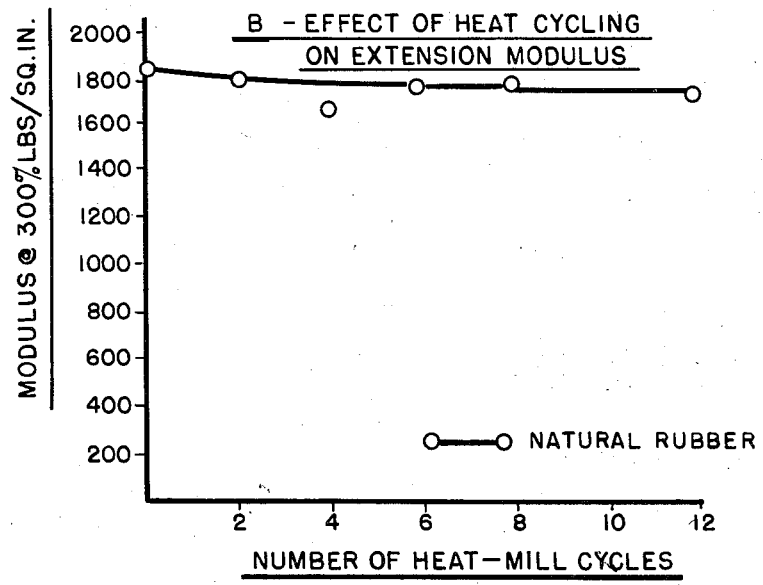

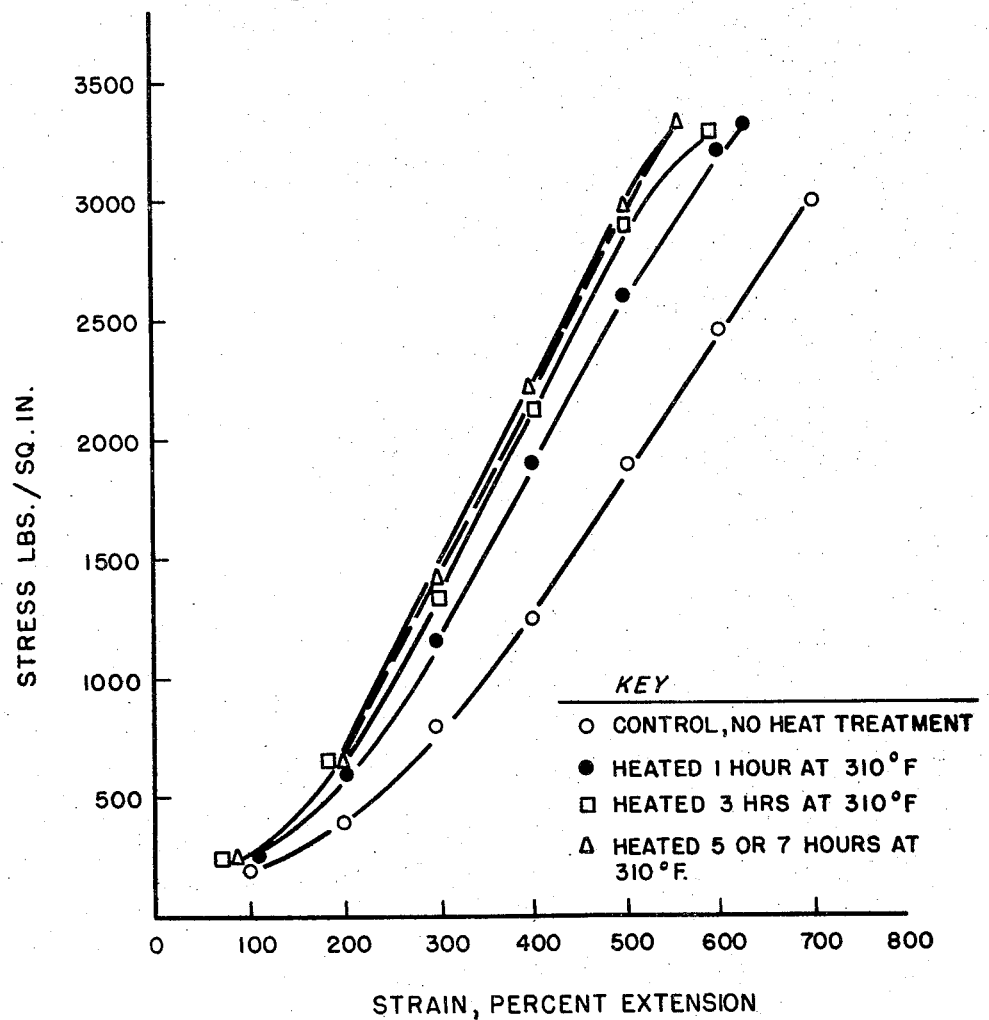

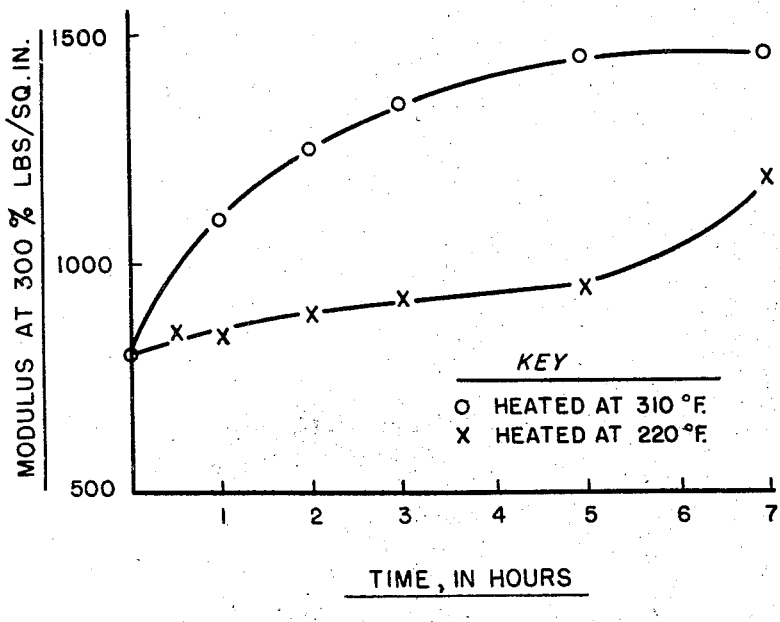

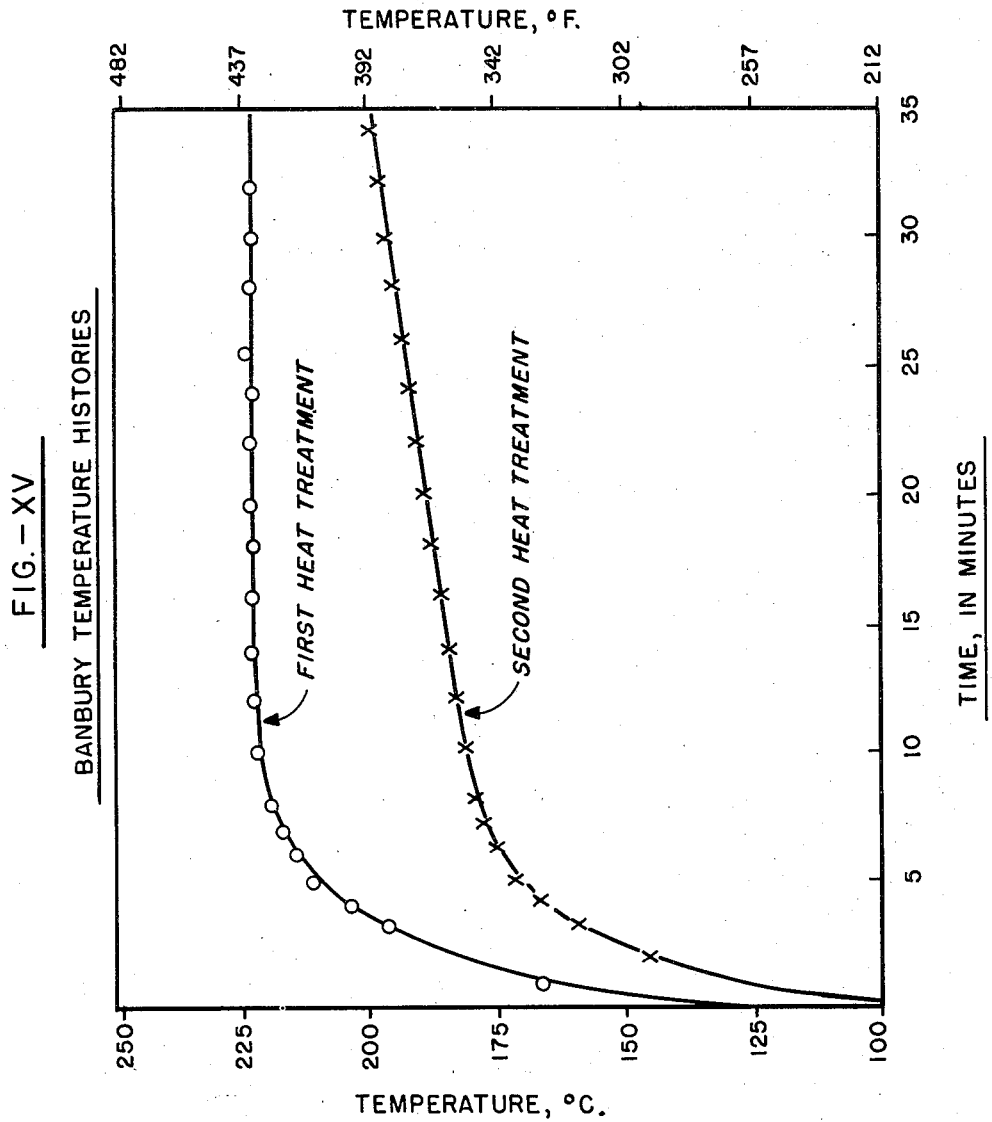

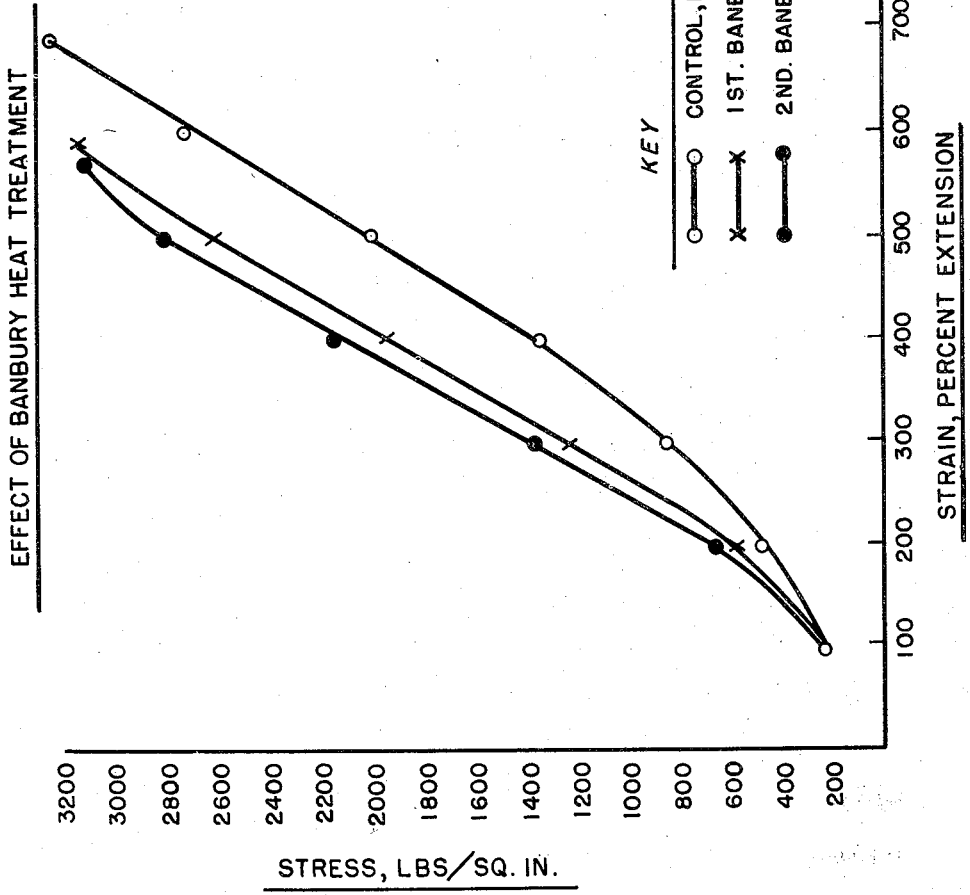

United States Patent Office 2,852,486
Patented Sept. 16, 1958

2,852,486

PROCESS OF HEAT-REACTING BUTYL RUBBER AND AN OXY-CARBON BLACK, PRODUCT OBTAINED THEREBY AND VULCANIZED PRODUCT OF SAME

Albert M. Gessler, Cranford, N. J., assignor to Esso Research and Engineering Company, a corporation of Delaware Application December 1, 1951, Serial No. 259,419

18 Claims. (Cl. 260—41.5)

This invention is concerned with novel techniques for processing and compounding synthetic, rubbery polymers, and more particularly, with novel methods for preparing new rubbery polymer compositions having outstanding properties and to such compositions themselves.

A method for preparing polymer-carbon black compositions having greatly improved physical characteristics has been discovered. This method generally is carried out by the thermal treatment of the raw polymer either with or without simultaneous or subsequent agitation, as by milling and mastication of mixtures of isoolefin-multiolefin copolymers with carbon black of the well-known types containing oxygen on their surfaces. Time and temperature relationships have been discovered for obtaining the maximum amount of quality improvement when operating by this method. The treatment is carried out prior to the addition of the total amounts of curatives and thus represents a thermal treatment of the polymer-carbon black mixtures prior to vulcanization.

The teaching of the prior art describes, generally, processes for heating rubber and rubbery products and especially highly unsaturated natural rubber in the presence of carbon black products as, for example, the process described in U. S. 2,118,601. The prior art, and particularly disclosure of the aforementioned patent, does not distinguish between the types of carbon black to be employed, indicating that any kind of black may be satisfactorily used. The patent teaches that the process described therein gives improved characteristics to the natural rubber compositions. However, it will be shown that the methods described by the prior art and the process of this invention are entirely different and do not give comparable results. Data is presented herein to show that the controlled heat treatment methods of this invention actually lead to substantially poorer quality compositions when natural rubber is so treated. Furthermore, it will be shown that, for this invention, it is necessary to employ a mixture containing carbon black which has active oxygen present on its surface.

Copolymers of isoolefin-multiolefin type having achieved great commercial importance especially in the manufacture of inner tubes, tire curing bags, wire insulation and acid tank linings. The isoolefin-diolefin copolymers have a number of outstanding qualifications which include relative imperviousness to the passage of gases, resistance to tearing, and highly chemical resistance, especially to oxidative degradation, presumably because of the low chemical unsaturation of the copolymer.

The highly favorable qualities of the isoolefin-diolefin copolymers would appear to make these polymers ideally suited as materials for the production of tire casings. However, the vulcanizates of these copolymers as heretofore produced are characterized by a sluggishness and lack of elasticity or resiliency. The problem becomes more acute when reinforcing fillers such as carbon black are used. This lack of resiliency property has long been a serious handicap to the practical and large scale use of these copolymers as a tire rubber, although the other qualities of the copolymers make them appear especially desirable for use in tire casings. Tires previously prepared from isoolefin-diolefin copolymer compositions made under conventional process conditions showed high rolling resistance giving a heavy drag on the vehicle and high abrasion wear and were generally unsatisfactory. Attempts to improve the resiliency properties by the addition of plasticizers to the copolymer compositions resulted in severe loss in tensile strength and modulus values, which rendered the materials totally useless for the production of tires.

Although it has been previously known that carbon black could be used in the compounding of isoolefin-multiolefin type polymers, as for instance in U. S. 2,363,703 employing unusually large amounts of carbon black, up to the time of the discovery of this invention no satisfactory way was known to the art for preparing isoolefin-multiolefin compositions with carbon black whereby the finished compositions would possess properties satisfactory for tire casing formulations, particularly with respect to the resiliency properties.

The heat treatment or thermal interaction method described herein is employed to overcome the sluggishness and lack of resilience of these copolymer-carbon black compositions and to increase the toughness and "nerviness" of the copolymers.

Carbon black normally increases the already high internal viscosity of the isoolefin-multiolefin vulcanizates. However, the copolymer-carbon black systems which have been subjected to the presently discovered heat treatment process show a much reduced effect of the carbon black on the internal viscosity of the copolymer product. The process as indicated before is limited to the use of carbon blacks which have an oxidized or an active oxygen-containing surface. Stated another way, this means that the surface of the carbon black must have a pH value of less than 7, even as low as 3.5.

The discovery that novel compositions could be prepared by the new thermal interaction methods herein described was surprising, particularly in view of the disclosures of the prior art. In articles in the journal, Rubber Chemistry and Technology 12, 298 (1939), and in the journal, India Rubber World 105, 270 (1941), it was indicated that the state of surface oxidation of the carbon black used has no effect as to the reinforcement effects given by the carbon black when it is used in diolefin-styrene rubbers and natural rubber. Furthermore, in the journal, Rubber Age 69, 183 (1951), it has been stated that the incorporation of oxidized furnace blacks into natural rubber offers no advantages over the use of regular furnace type blacks having no oxidized surface.

It is to be understood that the surprising effects which have been discovered to result from this improved thermal interaction method are substantially limited to synthetic isoolefin-multiolefin copolymers and are unique to these types of copolymers. Although from the standpoint of improved resilience, thermal treatments of natural rubber-channel carbon black mixtures give some minor improvements, the treatments produce more rapid degradation of the polymer after a time and result in decreases in tensile strength and reductions in extensibility. Thus, the extraordinary resistance shown by the isoolefin-multiolefin copolymers to either oxidative or mechanical breakdown make them uniquely adaptable for improvement by the process of the present invention.

It has been known to produce a valuable interpolymer by reacting a low molecular weight olefin, preferably an isoolefin such as isobutylene, with a low molecular weight multiolefin having from 4 to 14, inclusive, carbon atoms per molecule. Preferably, this second component is a conjugated diolefin having from 4 to 8 carbon atoms per molecule such as isoprene, butadiene, hexadiene, dimethyl butadiene and piperylene, although other diolefins such as dimethallyl and cyclopentadiene may also be used.

The polymerization reaction is carried out at a relatively low temperature, namely, below 0° C. and preferably below —50° C. and down as low as —164° C. in the presence of a suitable catalyst.

Suitable catalysts for use in carrying out the polymerization reaction are solutions of the known Friedel-Crafts polymerization agents. Thus, the active metal halides such as aluminum chloride, bromide, or iodide, or the uranium chlorides, titanium chloride, zirconium chloride, boron fluoride, stannic chloride, silicon chloride, or the like can be employed. The catalyst is dissolved in a low freezing, inert solvent such as a lower alkyl halide or hydrocarbon, or carbon disulfide. Solvents which can be employed include methyl chloride, ethyl chloride, compounds of the "Freon" type such as dichlorodifluoromethane, and the like, low molecular weight, aliphatic hydrocarbons, such as butane, the pentanes, carbon disulfide, etc.

Other catalytic substances which can be used are Friedel-Crafts catalysts complexed with such reagents as olefins, ethers, alcohols, and the like, and oxychlorides, hydroxychlorides, and complex chlorides and bromides of metals of the Friedel-Crafts types, such as aluminum hydroxychloride, titanium hydroxychloride, zirconium hydroxychloride, aluminum bromo chloride, aluminum alcoholates, and hydroxylated aluminum halides. A particularly effective catalyst has been found in a solution of aluminum chloride in methyl chloride. If desired, catalyst promoters and modifiers may be employed to modify the action of the catalyst solution.

In preparing the isoolefin-multiolefin copolymer, the olefinic mixture is first prepared. The isoolefin is preferably present in the feed mixture in the proportion of from 80 to 99 parts by weight, although a proportion as low as 50 parts can be employed, particularly where butadiene is the multiolefin employed. The multiolefin, more particularly a diolefin having from 4 to 8 carbon atoms, is preferably used in a proportion of 20 parts to 1 part; however, an amount up to 50 parts can be used.

With butadiene, the mixture may contain from 50 to 90 parts by weight of isobutylene with from 50 to 10 parts of butadiene. With isoprene, the preferred range is from 95 to 99.5 parts of isobutylene with from 5 to 0.5 parts of isoprene. It should be noted that most of the multiolefins do not copolymerize into the polymer in exactly the proportion in which they are present in the mixture. With a butadiene and isobutylene mixture, approximately 30% of butadiene causes the copolymerization of only about 1% of the butadiene into the final copolymer. Most of the other unsaturated reactants show different polymerization ratios, isoprene having as near to a 1:1 polymerization ratio with isobutylene as any multiolefin so far studied.

This olefinic mixture may be polymerized alone, but it is preferably diluted with an inert diluent or diluent-refrigerant such as liquid ethylene, liquid ethane, liquid methane, liquid propane, liquid butane, liquid methyl or ethyl chlorides, or mixtures of these several inert diluent-refrigerants. These inert diluents can be present in the reaction mixture in the proportion of from 2 to 5 or 6 volumes per volume of the mixed olefinic reactants. Also, an excess of solid carbon dioxide can be used either with or without an excess of an auxiliary diluent-refrigerant. The preferred diluent-refrigerant is liquid ethylene which produces a temperature of from —98° to —103° C. If desired, external cooling may be used. The polymerization reaction is carried out by circulating and/or agitating the cooled olefin-containing mixture with the catalyst solution. The reacting mixture may be circulated rapidly past cooling surfaces such as in a series of vertical or annular tubes submerged in a refrigerant. The catalyst solution is cooled and is applied to the mixture of olefins such as a fine spray or mist onto the surface or beneath the surface of the reacting mixture. The catalyst solution may also be introduced as a jet beneath the surface of the mixture. The catalyst should be rapidly mixed into and intimately dispersed throughout the entire body of the reacting mixture.

The amount of catalyst to be used is determined by the conversion level desired. In general, the desirable amount of catalyst is such as to yield an amount of polymer equal to from 10% up to 100% conversion of the isobutylene present, since the conversion level is usually expressed in terms of the amount of isobutylene. Preferably, the conversion limits are from 40% to 90% of the isobutylene.

The above description of the reactants, catalyst, solvents, and other details of the manufacture of the olefin-diolefin copolymer materials are well known in the art and need not be more fully set forth, but further details may be found in the many patents issued on the subject, especially U. S. 2,356,128.

When the desired amount of polymer has been produced, the reaction mixture containing the polymer is preferably dumped into warm water to bring the solid polymer product up to room temperature and vaporize out the residual materials from the polymerization step. The unreacted, recovered olefins and diluent can be suitably recovered and reused, if desired. Subsequently, the solid polymer is discharged as a slurry in water from which it is filtered, dried and milled for packaging, shipping and use. The catalyst may be inactivated while the mixture is still cold with such agents as alcohols, ethers, ketones, amines, and ammonia. Suitable recovery procedures are known as disclosed in, for example, U. S. 2,463,866.

It is also possible to carry out the polymerization of isoolefin-multiolefin mixtures in a solution type process in which the catalyst and reactants are in solution throughout the entire period of the process. Although this type of operation requires certain engineering modifications, it can be carried out along the same general lines as those above described. This polymerization process yields isobutylene-diolefin copolymers having an average Staudinger molecular weight number within the range between about 20,000 and 200,000 and a Wijs Iodine number of from about 1 up to 50. The correspondingly related 8-minute Mooney viscosity values of the copolymers should be at least 15 and may be higher up to 60 or even up to 160 or to the limit of the Mooney viscosity testing equipment. Polymers having extremely low molecular weights either do not cure at all or cure too poorly to be commercially useful, and polymers having molecular weights which are too high can become so tough and leathery that they are extremely difficult or impossible to process on the mill. The exact range of molecular weights obtained depends in part upon the temperature, in part upon the catalyst, in part upon the precise proportions of isobutylene and multiolefin used, and on the known control features. Any of these various isoolefin-diolefin copolymers can be successfully employed to carry out the process of this invention and to prepare the novel compositions herein described. Although the final products may vary somewhat with the precise polymer employed, it is not intended to limit the usable copolymers in any way to those specifically described but merely to show representative and typical kinds of copolymers which can be used. But, it is intended to show that the great benefits obtained in improved properties are peculiar to the treatment of isoolefin-multiolefin copolymers of low unsaturation.

This invention broadly contemplates the heating of mixtures of isoolefin-multiolefin copolymers and carbon black having active oxygen on the surface. Such a heating effects a thermal interaction between the copolymer and the surface of the carbon black. The heating may be either with or without simultaneous, subsequent or intermittent agitation such as milling or mastication and the time of such treatment will vary with temperature and agitation conditions.

It has been shown that milling or mastication alone without heating of the copolymer-carbon black mixture does not give the enhancement of the physical properties which is obtained by the thermal interaction treatment. In other words, at low temperatures the beneficial effects are obtained too slowly to be practical, if any thermal interaction occurs at all. On the other hand, the heating of the copolymer-carbon black mixtures without mechanical agitation gives some beneficial effects but the effects are substantially less than those obtained when the combined heat treating and agitation process is used. Optimum conditions of temperature and agitation seem to exist for different polymers.

To carry out the process of the invention, a mixture of isoolefin-multiolefin copolymer and carbon black of one of the types containing oxygen on its surface are subjected to heating for a period of time. There is a definite relationship between the time of heating, the temperature at which the mixture is being subjected, and the degree of improvement in physical properties gained. In general, the heat treatment without mechanical agitation of the mixture can be done in a heating vessel for a period of from about 1 hour up to 7 hours at a temperature ranging from about 250 to 450° F. Exposing the mixtures to a heating in open steam is one satisfactory procedure. The higher the temperature used the shorter the time required for the heat interaction treatment in order to obtain comparable results. Optimum results can be obtained by heat treating the mixture for about 5 hours at 320° F. For large scale operations, the shorter time periods are generally preferred.

Another manner in which this novel process can be carried out is by heat treating the copolymer and oxygen-containing carbon black mixture while subjecting it to mechanical agitation as in a Banbury mixer or on a rubber mill. For best results, in using the Banbury mixer, the copolymer and carbon black batch is generally heated at a temperature of from about 250° to 450° F. for about 10 to 60 minutes. Preferred conditions are heating and agitating at 380° to 450° F. for 20 to 40 minutes. There is also a close time-temperature relationship for the thermal interaction process when heating is combined with simultaneous mastication.

The improvements can also be achieved by the alternate heating and mechanical agitation treatment of the copolymer and carbon black mixture. These steps are conveniently carried out in cycles. Stationary heating can be done in an oven or other heating vessel at a temperature of 250 to 450° F. for periods of 15 to 60 minutes followed by a period of agitation, for instance, on a mill at 80 to 90° F. for a time of 2 to 10 minutes. These two heating and agitation steps can be repeated as many times as desired with some improvement being realized in each cycle. From 2 to 12 cycles may be conveniently employed. Commercial expediency prevents having more than about 12 cycles.

It is not intended to limit the process of thermal interaction or heat treatment of copolymer and oxygen-containing carbon black mixtures to these particular methods, since various other procedures and combinations of heating and agitation may be employed to achieve essentially the same results. In the procedures above described, improvements in tensile strength, modulus, internal viscosity and carbon black particle dispersion are obtained as indicated by the data of the examples shown below.

The type of carbon black suitable for the process and the amount thereof to be admixed with the isoolefin-multiolefin copolymers thereafter subjected to this thermal treatment may be varied widely. Any type of carbon black used must have an oxygen-containing surface such that the pH of the surface is below the value of 7. The amount of such carbon black which can be used may range from 20 parts by weight up to 200 parts by weight based on an amount of 100 parts by weight of copolymer. About 50 parts by weight of carbon black per 100 parts of copolymer is believed to be an optimum amount for many purposes.

It is to be understood that this treatment process is not adaptable to the use of all types of carbon black and it has been found that some types of carbon black are not useful for carrying out the process of the invention to prepare the new compositions. Broadly, the carbon blacks which constitute the filler materials used in the invention are those which have oxygen on the surface of the carbon black particles and show an acid reaction. It is not precisely known in what form the oxygen is present on the carbon nor is it intended to limit the invention to any kind of theory concerning the form of oxygen and carbon combination.

The observed, vastly improved, beneficial results were obtained when channel type blacks were used. One important way in which channel type carbon blacks are distinguished from furnace type carbon blacks is by the presence of chemisorbed oxygen on the surface of the former; while the latter has no such oxygen-containing surface.

The chemisorbed oxygen is generally believed to be combined on the surface of channel black as oxides of carbon and is present thereon as a result of the manner in which the channel black is prepared. This oxygen combination is responsible for surface pH which channel carbon blacks show. Thus, the higher the surface oxygen content the lower the pH or the more acidic is the surface as measured in a water slurry. In general, it is known that this chemisorbed surface oxygen can be removed as carbon monoxide and carbon dioxide when the channel carbon black is heated in the absence of air at a temperature of 1400–1800° F. It is well known that the removal of the chemisorbed oxygen does not interfere with particle size or internal structure of the carbon black. When such oxygen is removed, however, the responsiveness of the copolymer and deoxygenated carbon mixtures to heat treating and milling was greatly reduced and there was a reduction in tensile properties and an increase in viscosity properties of the finished compounds.

Carbon black, containing oxygen on its surface, can be obtained in numerous ways and it is not intended to limit the invention in any way thereto. For example, the carbon can be obtained with an oxygen containing surface as a result of the mode of its preparation or by a subsequent treatment. Thus, the so-called channel carbon blacks which are known to have oxygen on their surface are useful. The so-called furnace blacks differentiated by the absence of any appreciable amounts of oxygen are substantially useless when employed as such in this thermal treatment method. The furnace blacks, as well as other carbon blacks having no oxygen present, may be made completely satisfactory, however, by suitable treatment to produce an oxygen-containing surface thereon. This may be done by a variety of physical, chemical, and physico-chemical methods. These include treatment of the unoxidized carbon black surfaces with oxygen, oxygen-containing gases such as air, or with an oxygen-producing substance such as the peroxides or ozone. These methods, some of which are well known, form no part of the present invention.

In order to distinguish the carbon black having an oxygen-containing surface from the general term "carbon black," the term "oxy-black" will be used in this specification and its claims. It is to be understood that this term "oxy-black" is intended to mean a carbon black material containing oxygen on the surface and having a pH below 7, but otherwise manufactured by any process producing such a carbon black or by a subsequent treating process which produces an oxygen-containing surface.

It is further intended that for the process and compositions of this invention any of the channel blacks such as, for instance, EPC, MPC, HPC and CC can be used, these letters denoting carbon black products well known to the trade. Furnace blacks which have been subjected to any process whereby an oxygen-containing surface is produced thereon can be used and these included SRF, HMF, CF, FF and HAF carbon blacks. Thermal blacks to which the oxygen surface has been added can also be used.

Although the prior art of compounding rubber has taught that the use of carbon blacks with very acidic surfaces, for instance, of a pH less than 4, is undesirable because of increased adsorption of many accelerators, it has been found that in the heat interaction of carbon black and isoolefin-multiolefin copolymer systems the retardation of cure is not significant. The proper heat treatment of the oxygen-containing carbon black copolymer systems actually increases the ability of such systems to develop high moduli values using the same concentrations of accelerator and sulfur.

If desired, these heat treated polymer-carbon black products may be modified by mixing therewith substantial amounts of mineral fillers, pigments, etc., such as pulverized clays, limestone dust, pulverized silica, diatomaceous earth, iron oxide, sulfur, additional carbon black, and the like. These materials may be admixed prior to the heat treatment but preferably thereafter and may be used either in small amounts such as $\frac{1}{10}$% to 1% or 5% or so, or in large amounts, for instance, 5% to 20% or 30% to 60% or more as is known in the compounding art. Also, it may be desirable to incorporate a substantial amount of a plasticizer or softener, such as paraffin wax, petrolatum, viscous mineral lubricating oil, a petroleum oil, or a small amount of a relatively non-volatile organic compound such as dibutyl phthalate, or dioctyl phthalate with the heat treated copolymer-carbon black composition. Also, other substances may be added, such as dyes and anti-oxidants, if desired.

The copolymer composition after the present heat treatment can be combined with sulfur, other plasticizers and the like, and suitable sulfurization aids such as "Tuads" (tetramethylthiuram disulfide), or "Captax" (mercaptobenzothiazole), or "Altax" (2,2'-benzothiazyl disulfide) in the usual manner. Non-sulfur curing agents may also be used. The polymer, when so compounded, is cured into an elastic, rubber-like substance by the application of heat within a temperature range of 275 to 395° F. for a time interval ranging from 15 to 120 minutes in the usual way.

The products of the above described treatments are believed to be new compositions, although it is known that various carbon blacks have been admixed with olefin-diolefin rubber heretofore. Such prior compositions have been widely used as inner tube stocks and for various other purposes but they have not been satisfactory for abrasion-resistant purposes, as exemplified by tire tread stocks. This is well known in the art and is the outstanding feature of the new compositions. These mixtures differ from the older admixtures, principally in this respect, and are characterized by increased tensile strength, increased resilience, lower heat build-up during flexure and other vibration.

The compositions, to superficial observation, are similar to the known mixtures, except that they appear softer; but in their use and on subjection to suitable tests, their differences are startling.

Although it is not intended to limit the invention to any particular physical or chemical theory, it is suggested from studies of the data obtained as an explanation for the results obtained by this process, that an actual interaction takes place between the oxygenated carbon black particles and the copolymer molecules during the heating period.

Such an effect is indicated, however, from the known facts that, in general, as oxygen content of the carbon particle surface is increased, where particle size remains constant, the amount of "bound" copolymer becomes accordingly greater. The expression, "bound" copolymer, is used to characterize the portion of the copolymer in the copolymer-carbon black mixture which is insoluble when solution experiments are conducted on the unvulcanized mixture. It is thus suggested that there is some kind of molecular bridge or bond formed between the carbon black surface and the copolymer chain through the oxygen present on the carbon black. The formation of this bond or bridge occurs during the heat treatment of the copolymer-carbon black mixture and its formation is assisted by agitation of the mass as by milling or mastication. Likewise, during the heat treatment and agitation, greater dispersion of the carbon particles takes place and the discrete carbon particles can act as individual bridges between the molecular chains, and not as large, irregular agglomerates. This allows a greater degree of orientation of the polymer chains and contributes both to greater strength and reduced internal viscosity. It has also been shown that the ability of the polymer chains to orient within the mass and, consequently, the internal viscosity, is related to the abrasion resistance of the ultimate cured vulcanizate.

Another indication of the effects which result from this heat treatment process is the fact that the specific resistivity of the compositions increases with the extent of heating and mastification. It can be assumed that in the untreated sample, the electric charge passes through the material by leaping from one agglomerate of carbon black filler to another. Since in ordinary compositions only a relatively small portion of the total carbon black particles are attached or "bound" to the polymer particles, the electric charge encounters relatively little resistance to its passage along predominantly carbon paths. After heat-mill cycling, the carbon particles are rendered more discrete and carbon-carbon bonds are largely replaced by carbon-polymer bonds through the oxygen linkages. As a result, passage of the electrical current becomes increasingly difficult because the nonconducting polymer masses can no longer be by-passed by routes which consist predominantly of carbon-carbon chains and the specific resistivity is thus increased.

From what has been said before as to the treating process, it will be understood that various copolymers of the olefin-diolefin type, and especially those having molecular weights of from 20,000 to 200,000 and iodine numbers below 50, such materials having been collectively known under the general term of "GR-I," are applicable to this process. It may be desirable to describe more specifically the treated or reacted products which are believed to be new and to mark a definite forward step in rubber technology. These treated compounds are true chemical combinations since the heat treatment effects a reaction between the oxy carbon and the copolymer itself, presumably through an oxygen bridge. Strong evidence is available to this effect, especially the increased tensile properties and the lowered internal viscosity, or more properly, the fortunate tendency in the direction of producing better tensile or stress properties for the given internal viscosity or vice versa. This is not gained without the heating stage, also, the dependence on temperature is normal for a chemical reaction. This combination of properties increases with the time and the severity of the treatment and indicates an increasing amount of the copolymer-oxygen-carbon reaction product within the mixture. The reacted materials are characterized by increased abrasive resistance and decreased heat build-up on flexure after vulcanization. The product is more flexible and exhibits superior drape. The well-known chemical resistance of GR-I is clearly preserved in these new products, and other desirable properties are also present, such as resistance to tear and resistance to passage of gas. The material may be handled on the mill or in the Banbury mixer just as can ordinary rubber or other GR–I products and can be fabricated in the same conventional manner. Its reaction to various fillers, accelerators, plasticizers and the like is substantially the same as are those of the ordinary olefin-diolefin rubbers.

The most remarkable evidence of true chemical reaction between the oxy-black and the rubber copolymer is the fact that, after the treatment as described above, the bound rubber content of the mixture is much higher than has ever been found in the case of ordinary GR–I carbon black mixtures. The bound rubber content of the heat-treated copolymer varies from about 15% and upward by weight of the polymer and the amount present depends on the time and general severity of the pretreatment. This change in the bound rubber content is particularly important because of its permanent and irreversible effect. Where bound rubber has been referred to in prior art compositions, its presence was believed to be explained by molecular orientation and a higher degree of dispersion of the carbon black within the polymer. Such effects are not permanent and the compositions will revert on milling, showing that there is ordinarily no chemical reaction between the carbon and the polymer. There is, however, a marked distinction in the case of the nature of the bound rubber and its content in the present compositions where the effect is, as stated above, permanent and irreversible. The irreversibly bound rubber ranges from 15% to 50% or more.

What has been said above is particularly applicable to unvulcanized, pretreated copolymer-oxy-carbon black compositions, but the vulcanized products are equally new whether the vulcanization is effected by the sulfur cures or the well-known non-sulfur cures carried out by the use of the quinone dioximes, or dinitrosobenzene, and their equivalents. In both instances, it will be noted that the pretreatment has effected the chemical combination between the black and the copolymer which combination is then vulcanized in the manner hitherto known.

The present products have been especially indicated as tire tread and tire casing materials, since such use has not heretofore been made of GR–I polymers. Such polymers have long been thought useless for that purpose. The present invention, therefore, extends the applicability of these polymers to an entire range of usefulness which has previously been reserved for natural rubber alone. Thus, these products can be used successfully for many other purposes, for example, for inner tube stocks, electrical insulation, lining for tanks, for rolls, for furniture, upholstery and bedding, elastic pads, shoe soles, waterproof fabrics, and the like. In all these instances, the treated copolymer not only possesses the improved qualities added to the pretreatment but also retains the high chemical resistance of the original untreated copolymers.

The following examples are presented to illustrate the process but it is not intended that the invention be specifically limited thereto.

EXAMPLE 1

*Influence of surface oxygen on channel carbon black*

A study was made of the influence of the presence of oxygen on the surface of the channel carbon black. A sample of channel carbon black was subjected to a devolatilization treatment to remove the oxygen from the surface. This devolatilization treatment was carried out on a quantity of channel black with an average particle diameter of 30 mm. The sample was placed in a stainless steel tube and a vacuum was applied. The tube and its contents were heated for 3 hours in an electric muffle furnace at a temperature of 1600° F. The carbon black was cooled under a vacuum. The surface pH before and after such treatment is shown below.

| Carbon sample: | Surface pH (water slurry) |
|---|---|
| Channel black (control) | 4.9 |
| Devolatilized channel black | 9.2 |

These data clearly show the inter-relation between oxygen content and surface pH of the carbon black.

The devolatilized carbon and the control channel black carbon were compounded into four separate compositions of isobutylene-isoprene copolymer. These compounded samples represented combinations of the two methods of operation for the two types of carbon black surfaces. Preparations of these samples are presented in tabular form below in Table 1. Amounts are given in parts by weight.

TABLE 1

| Sample No | 1 | 2 | 3 | 4 |
|---|---|---|---|---|
| Isobutylene-Isoprene copolymer | 100 | 100 | 100 | 100 } Portions for |
| Channel black (control) | 50 | 50 | | } thermal |
| Devolatilized channel black | | | 50 | 50 } interaction. |
| Zinc oxide | 5 | 5 | 5 | 5 |
| Sulfur | 2 | 2 | 2 | 2 |
| Tetramethylthiuram disulfide | 1.25 | 1.25 | 1.25 | 1.25 |
| Type of mixing | Standard Mill Mix. | Heat treated and remilled. | Standard Mill Mix. | Heat treated and remilled. |

The standard mill mixing was just sufficient to incorporate the carbon black in 10 minutes at an 0.035" mill setting on a cold (80°–90° F.) 12" laboratory mill. The heat treating and remilling procedure was performed on just the copolymer-carbon black mixtures with no vulcanizing agents present. This procedure consisted of repeated heatings in steam for ½ hour at 330° F. followed by 5 minute milling periods at 0.035" mill setting. Twelve such cycles were carried out.

After the above mixing procedures were completed, the vulcanizing agents were added and the samples were vulcanized at 320° F. for 40 minutes. This level of vulcanization is believed to be optimum for giving a product having the best resilient properties.

The dynamic behavior of the vulcanized samples 1 through 4 was studied by the free vibration in compression of a cylindrical pellet in a weighted pendulum apparatus frequently referred to as the Yerzley oscillograph. The damping or hysteresis effect is expressed as a product of internal viscosity and frequency since in free vibration systems the frequency cannot be controlled at a constant value. The absolute damping effect or the work of compression that is absorbed as heat is related to frequency and internal viscosity by the following equation:

$$\text{Absolute damping} = W\eta = 2\pi^2 f\eta AM^2/h$$

where $f$ = frequency
$\eta$ = internal viscosity
$M$ = amplitude
$A$ = cross sectional area of pellet
$h$ = height of pellet $M$, the amplitude, is controlled by the amount of weights added to the pendulum, $A$ and $h$ are dimensional constants so $\eta f$ is directly related to the energy loss upon vibration. The damping term, $\eta f$, is directly proportional to the internal viscosity and inversely proportional to the elasticity or resilience of the vulcanized sample.

Measurements of this $\eta f$ function were made at three temperatures on samples 1 through 4. These measurements are plotted in Figure I. The temperature functions are roughly the same with the control mixes for either the regular channel black or the devolatilized channel black. These exhibit the highest level of damping. When the carbon black-copolymer mixtures are subjected to the heat treatment and remilling procedures, the specific advantages of the oxygenated surface of the regular channel black with regard to its effect on internal viscosity are emphasized. The $\eta f$ function for the sample of regulation channel black of pH 4.9, having an oxygen-containing surface, is about one-half that of the sample from which the oxygen was removed.

EXAMPLE 2

*Effect of adding surface oxygen to fine particle furnace black*

Since it is well known that furnace carbon blacks have essentially unoxidized surfaces, a study was made of the effect produced by the addition of oxygen to the surface of a furnace carbon black sample.

For carrying out the following experiments, an HAF furnace black was heat treated in the presence of an oxygen flow in an oven at a temperature of 250°–275° C. for about 65 hours. The original pH of the carbon in a water slurry, was about 8.7. At the end of that time, the surface pH of the carbon black was 4.7. The combined oxygen was determined analytically by the Unterzaucher method to be 3.82%. A commercial grade of channel type carbon black has been shown to have about 3.17% by weight combined oxygen. Both of the carbon blacks have a particle size falling within the same range of 28–32 mm. for average particle diameter.

In carrying out the experiments for evaluation of the oxidized furnace black as prepared by the above described method, the untreated furnace black (control) and the oxygenated furnace black were mixed with isobutylene-isoprene copolymer on a laboratory mill (setting=0.040″) to give a master batch. The mixing data are shown below in Table 2.

TABLE 2

| Compound | Sample | |
|---|---|---|
| | 1 | 2 |
| Copolymer | 600 | 600 |
| Furnace Black Control | 300 | |
| Oxygenated Furnace Black | | 300 |
| Stearic acid | 3 | 3 |

Each sample was split into two parts and each was studied to determine the effects of increased milling and heating. The degrees of milling are designated A and B and represent respectively, no further milling, and heating at 330° F. and milling for 5 minutes as a cycle for twelve times.

After these treatments were applied, the curatives were added and the finished compounded products may be indicated as follows in Table 3. The amounts are in parts by weight.

TABLE 3

| | Sample | | | |
|---|---|---|---|---|
| | 1A | 1B | 2A | 2B |
| Batch-Control Furnace Blk | 301 | | | |
| Do | | 301 | | |
| Do | | 301 | | |
| Batch-Treated Furnace Blk | | | 301 | |
| Do | | | 301 | |
| Do | | | | 301 |
| Zinc oxide | 10 | 10 | 10 | 10 |
| Sulfur | 4 | 4 | 4 | 4 |
| Tetramethylthiuram disulfide | 2.5 | 2.5 | 2.5 | 2.5 |

(Portions from thermal interaction)

Each finished compound sample contains 50 parts of the carbon black per 100 parts of raw polymer.

The stress properties at various extensions were determined over a range of vulcanization times. These included 10, 20, 40 and 80 minute cures at 300° F. The results are shown in Figure II with four columns, each of which represents a sample.

The first two columns show that very little difference exists in the stress properties of copolymer-unoxygenated furnace black mixtures between the "heated and milled" sample and the sample of unheated mixture. Both samples show a marked decrease in tensile strength as the vulcanization process proceeds.

However, when the furnace carbon black with the oxygenated surface is compounded in the copolymer, there is shown an increase in tensile strength which is greatest for about 40 minutes treatment. Decrease in tensile strength is not as sharp as it is with sample containing control HAF black and does not occur until after 40 minutes. Much higher moduli are obtained from the heated and milled oxidized HAF carbon black system than from any of the other systems. This result demonstrates the enhancement in stress-strain properties which is realized with the process of this invention.

EXAMPLE 3

*Effect of adding surface oxygen to large particle furnace black*

When a furnace carbon black of larger particle size is treated with oxygen, the improvements shown are even greater than those shown by the smaller particle size carbon black. Thus, an SRF furnace carbon of 80 mm. average particle diameter, was heated at 300° C. in a stream of oxygen for 70 hours. At the end of that time, the carbon black surface changed from a pH of 9.5 to a pH of 3.6. The product had a combined oxygen content of 3.67 by weight.

Since this furnace carbon black has a larger average particle diameter, the advantageous results obtained from the carbon black in the above Example 2 are magnified. This SRF furnace black and its oxygenated product were compounded into isobutylene-isoprene copolymer in the same manner as was done in Example 2. The batch of control SRF carbon in copolymer is indicated as sample 3 and the batch of oxygenated SRF carbon in copolymer as sample 4. Each was split into two parts and studied to show the effect of increased heating and milling. Parts designated by the letter A received no further milling; the parts called B were heated and milled for twelve times. Table 4 below summarizes the compounding data. The amounts are in parts by weight.

TABLE 4

| | Sample | | | |
|---|---|---|---|---|
| | 3A | 3B | 4A | 4B |
| Batch-Control SRF Furnace Black | 301 | | | |
| Do | | 301 | | |
| Batch-Treated SRF Furnace Black | | | 301 | |
| Do | | | | 301 |
| Zinc Oxide | 10 | 10 | 10 | 10 |
| Sulfur | 4 | 4 | 4 | 4 |
| Tetramethylthiuram disulfide | 2.5 | 2.5 | 2.5 | 2.5 |

(Portions from thermal interaction)

Vulcanization of the samples was conducted at 300° F. for 10, 20, 40 and 80 minutes. The resulting stress-strain properties of the four cured samples are plotted as a function of the cure in Figure III.

These results clearly show that the regular SRF carbon black either in the control mixture or in the heat treated and milled mixture has a much lower level of ultimate tensile strength. Furthermore, this strength falls off rapidly as the vulcanization progresses. However, in the case of the oxidized SRF carbon black, the very high tensile strength is maintained at substantially the same high level throughout the entire time of vulcanization.

The comparative responsiveness of the two types of pigment surfaces to thermal treatment or interaction shows that the heat treatment and remilling of the samples containing regular SRF carbon black actually lowers the moduli of the vulcanizates. This is shown in the first two columns of Figure III. The third column shows that the oxidized surface furnace black has higher overall tensile strength but lower moduli than those of the regular untreated carbon black. After the heat treatment, however, the oxidized surface furnace black carbon shows moduli values which are greatly increased over those of any of the other compounds.

EXAMPLE 4

*Dynamic properties of samples from Example 2*

A study was made of the elastic or dynamic properties of the samples of Examples 2 and 3. These studies were carried out in an apparatus where the systems were observed under forced vibrations. These systems operate under conditions of constant frequency and amplitude wherein the thin samples are flexed under tension. A 3" x ¼" x .075" sample was used under 10% static extension. A superimposed dynamic deflection of an additional 10% was applied by the eccentric at a frequency of 16 cycles per second. Relative damping and dynamic modulus were determined with a strain gauge and a linear variable transformer in conjunction with an oscilloscope. The internal viscosity in poises was determined from the dynamic modulus and relative damping relationship:

$$\eta \text{ (poise)} = \frac{2k(\text{percent relative damping})}{\pi^2 f (200 - \text{percent relative damping})}$$

$\eta$ = internal viscosity
$k$ = dynamic modulus (dynes/cm.$^2$)
$f$ = frequency in cycles/second
Percent = relative damping The dynamic properties of both the oxidized and unoxidized HAF black-copolymer systems under conditions of forced vibration are shown in Figure IV. Samples 1A, 1B, 2A and 2B were studied. The data are plotted in relation to the temperature as an Arrhenius plot. The compounds containing the oxidized surface carbons are generally characterized by lower damping factors. Furthermore, there is a striking effect shown by the heat treatment and remilling upon the composition containing oxidized surface carbon black. The two columns of Figure IV show that the oxidized surface carbon black systems which display low internal viscosity also show lower dynamic modulus, that is, decreased stiffness, at all temperatures. These numerical values are consistent with the visual observations concerning the "drape" of the cured slab samples.

EXAMPLE 5

*Dynamic properties of samples from Example 3*

It is to be further observed that, when oxygen is present on the surface of a carbon black having a relatively larger particle size, the level of the internal viscosity is much lower than it is with a finer particle carbon. Thus, the surface oxidation and subsequent heating and milling of compositions containing large particle oxidized carbon blacks, yields very resilient compounds.

The data obtained in these studies on SRF furnace carbon black are shown in Figure V. These compounds which have low hysteresis and high strength are especially useful for fabricating tire casings. The high extension modulus coupled with a low dynamic modulus indicates a more elastic and less viscous system which possesses the more desirable properties for carbon black-polymer compositions.

EXAMPLE 6

*Stress-strain studies on heat-mill cycled channel black compositions*

The following master batch was mixed in the Banbury mixer under "cool" (below 240° F.) conditions:

| | Gms. |
|---|---|
| Isobutylene-isoprene copolymer | 1500 |
| EPC channel carbon black | 750 |
| Stearic acid | 7.5 |

The temperature of the batch on dumping was 225° F.

The batch was split into seven 301.0 gm. portions and these were "heat cycled" 0, 1, 2, 3, 4, 5 and 6 times respectively. Each cycle consisted of a half hour heat in open steam at 320° F. and then a 5 minute milling on an open mill at 80°–90° F. with a clearance of 0.040" to 0.045" between the mill rolls. Vulcanizing agents were added during the final milling period of each cycle. The added vulcanizing agents, based on each 301.0 gms. portion of the masterbatch, were:

| | Gms. |
|---|---|
| Zinc oxide | 10.0 |
| Sulfur | 4.0 |
| Tetramethylthiuram disulfide | 2.0 |
| 2,2' benzothiazyl disulfide | 2.0 |

The completed compounds, after cycling and the addition of vulcanizing agents, were vulcanized in a press for 20 minutes at 307° F. A series of specimens was also vulcanized for 10, 15, 20 and 30 minutes at 307° F. to obtain a cure curve.

All of the vulcanizates were submitted to stress-strain analysis using standard ASTM procedure. Table 5 shows the results which were obtained from the specimens vulcanized for 20 minutes.

TABLE 5.—STRESS-STRAIN PROPERTIES

| | Number of Heat-Mill Cycles | | | | | | |
|---|---|---|---|---|---|---|---|
| | 0 | 1 | 2 | 3 | 4 | 5 | 6 |
| Modulus @ (#/in.$^2$): | | | | | | | |
| 100% | 200 | 225 | 250 | 240 | 250 | 250 | 225 |
| 200% | 410 | 500 | 550 | 650 | 625 | 600 | 600 |
| 300% | 750 | 1,000 | 1,100 | 1,250 | 1,300 | 1,350 | 1,400 |
| 500% | 1,800 | 2,275 | 2,525 | 2,750 | 2,850 | 2,900 | 3,050 |
| 600% | 2,525 | 2,950 | 3,200 | 3,300 | | | |
| Tensile Strength (#/in.$^2$) | 3,050 | 3,300 | 3,300 | 3,300 | 3,250 | 3,400 | 3,400 |
| Percent Ultimate Elongation | 700 | 670 | 630 | 605 | 600 | 585 | 580 |
| Shore Hardness, Durometer A | 60 | 55 | 56 | 55 | 55 | 52 | 50 |

The modulus, except at low extensions, increases sharply with each heat cycle and reaches almost double its original value. Increased tensile strength is also shown to be a result of heat cycling. The ultimate extensibility of the vulcanizate decreases slightly but is not considered to be a disadvantage. The Shore hardness values which are included decrease despite the increase in modulus. This is evidence of the increased suppleness which results from the heat cycling process.

In Figure VI, the modulus at 300% is plotted as a function of the number of heat cycles for vulcanizates cured over a range of times at 307° F. The improved behavior which was apparent from data of Table 5 is thus shown to apply to the whole range of vulcanizates prepared.

EXAMPLE 7

*Damping studies of samples from Example 6*

The vulcanizates were also tested for internal viscosity by damping studies. In this test the modified Yerzley method as developed by F. P. Baldwin and described in the journal "The Rubber Age," April 1950, was used. A brief description of this test was given under Example 1.

The $\eta f$ values which were obtained from the heat-mill cycled compounds described above in Example 6 are given for 3 different temperatures in Table 6.

TABLE 6.—EFFECT OF HEAT-MILL CYCLING ON DAMPING

| Number of Heat-Mill Cycles | $\eta f \times 10^{-6}$ (poises×C. P. S.) | | |
|---|---|---|---|
| | at 30° C. | at 50° C. | at 65° C. |
| 0 | 8.59 | 5.04 | 4.16 |
| 2 | 4.76 | 3.14 | 2.18 |
| 4 | 4.64 | 2.83 | 1.87 |
| 6 | 3.91 | 2.36 | 1.63 |

The internal viscosity of the vulcanizates, as judged by $\eta f$, the damping factor, decreases very sharply as the batch is cycled. At all three temperatures, the reduction in internal viscosity is greater than 50%. The heat-mill cycling also produces an increase in both the modulus and the tensile of the resulting vulcanizates (as was shown in Example 6) so that the reduction in internal viscosity is obtained simultaneously with an overall improvement in product quality.

These data on internal viscosity are plotted in Figure VII against the temperature as an Arrhenius plot. This plotting gives a series of essentially parallel lines and shows the reductions in hysteresis or damping which result from heat-mill cycling. Although the greatest reduction in $\eta f$ (damping) is obtained during the first two cycles, the improvement continues to be present up to and even beyond the extent of the heat treatment used. At all temperatures, the damping effect is reduced by more than 50% after 6 cycles.

EXAMPLE 8

*Comparative data using a plasticizer to reduce internal viscosity*

General practice in the present art has been to use plasticizer to decrease internal viscosity and increase resiliency in polymer vulcanizates. In order to obtain the results comparative to those of Example 7, by the use of plasticizer, it would require at least 15 parts of a high grade plasticizer oil. With plasticizer, however, the reduction in internal viscosity is accompanied by a sharp decrease in both modulus and tensile strength. A comparison of the results obtained by these two methods is shown in Table 7. All the samples were vulcanized for 20 minutes at 307° F.

TABLE 7.—COMPARISON OF PLASTICIZATION AND HEAT-MILL CYCLING

| | Heat-Mill Cycling | | Plasticization | |
|---|---|---|---|---|
| | Control | Heat-Mill Cycled, 6 Times | Control | With 15 Parts of Forum 40 Plasticizer |
| Modulus at (#/in.²): | | | | |
| 100% | 200 | 225 | 225 | 150 |
| 200% | 410 | 600 | 460 | 225 |
| 300% | 750 | 1,400 | 880 | 460 |
| 400% | 1,200 | 2,250 | 1,400 | 760 |
| 500% | 1,800 | 3,050 | 2,075 | 1,200 |
| 600% | 2,525 | | 2,750 | 1,800 |
| 700% | | | | 2,350 |
| Tensile Strength (#/in.²) | 3,050 | 3,400 | 3,200 | 2,725 |
| Percent Elongation | 700 | 580 | 700 | 780 |
| $\eta f$-Percent Decrease over Control: | | | | |
| at 30° C | | 54.7 | | 56.0 |
| at 50° C | | 52.0 | | 53.7 |

EXAMPLE 9

*Electrical resistivity studies on heat-mill cycled vulcanizates*

The specific resistivity in ohm centimeters was obtained for a series of heat-mill cycles vulcanizates using MPC channel black. The samples tested were prepared as described in Example 6. The data which were obtained are shown in Table 8.

TABLE 8.—EFFECT OF HEAT-MILL CYCLING ON ELECTRICAL RESISTANCE

| Number of Heat-Mill Cycles | Specific Resistivity, in Ohm Cm. |
|---|---|
| 0 | $5.70 \times 10^7$ |
| 2 | $1.64 \times 10^8$ |
| 4 | $1.39 \times 10^9$ |
| 6 | $5.83 \times 10^{10}$ |

The specific resistivity is seen to increase with heat-mill cycling and this result indicates an improved dispersion since electrical current is carried along carbon particles.

The electrical resistivity data indicate that the dispersion of furnace black compositions is not improved by heat cycling. Figure VIII shows data obtained from vulcanizates prepared with both MPC channel black and HMF furnace blacks.

Although milling ordinary, rubber-carbon black mixtures results in improved dispersion of the carbon black particles, when heat is subsequently applied as for vulcanization, there is a reversion as flocculation of the black takes place. In other words, carbon to carbon associations are remade. However, when the thermal interaction process has been used to treat the polymer-carbon black mixture, there is a permanent association formed between the polymer and the carbon, and this association is not broken down upon vulcanization.

As a clear indication of this permanent association, data show that mixtures of copolymer and carbon black, after eight heat-mill cycles have 48% of "bound" rubber, that is, rubber that is insoluble in solvents because of interaction with the carbon. This percentage of "bound" rubber remains substantially unchanged even after long and severe milling or further heating treatment.

EXAMPLE 10

*Extended heat-mill cycling*

A set of heat-mill cycle experiments was performed. The procedure employed was the same as that used in Example 6 above. The heat-mill cycling was extended to 12 times. Three batches were prepared using, in each case, 50 parts by weight of the carbon black together with 100 parts by weight of isobutylene-isoprene copolymer. The carbon blacks used were HAF black, SRF black and MPC black. The vulcanizates were cured for 20 minutes at 307° F. The detailed data obtained from these experiments are shown in Table 9.

TABLE 9.—HEAT-MILL CYCLING vs. CARBON BLACK TYPE

| Type of Carbon Black | HAF Carbon Black | | | |
|---|---|---|---|---|
| Number of Heat-Mill Cycles | 0 | 4 | 8 | 12 |
| Modulus at (#/in.²): | | | | |
| 100% | 300 | 300 | 300 | 300 |
| 200% | 725 | 725 | 750 | 710 |
| 300% | 1,200 | 1,350 | 1,375 | 1,360 |
| 400% | 1,775 | 2,025 | 2,050 | 2,060 |
| 500% | 2,225 | 2,575 | 2,590 | 2,625 |
| Tensile Strength (#/in.²) | 2,575 | 2,750 | 2,760 | 2,800 |
| Percent Elongation | 580 | 550 | 545 | 550 |
| Damping, $\eta f \times 10^{-6}$ (poises×C. P. S.): | | | | |
| at 30° C | 7.80 | 5.79 | 6.33 | 6.64 |
| at 50° C | 4.81 | 3.79 | 4.14 | 3.78 |
| at 70° C | 3.26 | 2.56 | 2.60 | 2.47 |

TABLE 9—Continued

| Type of Carbon Black | SRF Carbon Black | | | |
|---|---|---|---|---|
| Number of Heat-Mill Cycles | 0 | 4 | 8 | 12 |
| Modulus at (#/in.²): | | | | |
| 100% | 250 | 250 | 235 | 240 |
| 200% | 490 | 500 | 500 | 500 |
| 300% | 750 | 800 | 800 | 825 |
| 400% | 1,015 | 1,120 | 1,125 | 1,200 |
| 500% | 1,350 | 1,440 | 1,430 | 1,540 |
| 600% | 1,700 | 1,800 | 1,780 | 1,850 |
| Tensile Strength (#/in.²) | 1,800 | 1,910 | 1,780 | 1,950 |
| Percent Elongation | 620 | 620 | 600 | 610 |
| Damping, $\eta f \times 10^{-6}$ (poises×C.P.S.): | | | | |
| at 30° C | 3.31 | 3.01 | 2.86 | 3.03 |
| at 50° C | 1.99 | 1.75 | 1.59 | 1.75 |
| at 70° C | 1.51 | 1.22 | 1.18 | 1.24 |

| Type of Carbon Black | MPC Carbon Black | | | |
|---|---|---|---|---|
| Number of Heat-Mill Cycles | 0 | 4 | 8 | 12 |
| Modulus at (#/in.²): | | | | |
| 100% | 250 | 250 | 230 | 250 |
| 200% | 460 | 620 | 700 | 700 |
| 300% | 840 | 1,370 | 1,620 | 1,730 |
| 400% | 1,350 | 2,220 | 2,525 | 2,650 |
| 500% | 1,900 | 2,960 | 3,275 | 3,425 |
| 600% | 2,575 | | | |
| Tensile Strength (#/in.²) | 3,400 | 3,570 | 3,675 | 3,650 |
| Percent Elongation | 740 | 600 | 570 | 570 |
| Damping, $\eta f \times 10^{-6}$ (poises×C.P.S.): | | | | |
| at 30° C | 7.61 | 4.61 | 3.99 | 3.60 |
| at 50° C | 4.92 | 2.49 | 2.06 | 1.81 |
| at 70° C | 2.87 | 1.46 | 1.36 | 1.14 |

The desirable effects produced by the heat treatment involving up to 12 heat-mill cycle experiments are found to be specific to channel black carbon of the commercial carbon blacks when used directly as prepared. After 12 cycles of the HAF furnace black batch, the modulus at 300% increases only 15%, the internal viscosity at 50° C. decreases only 20%, and the electrical resistivity remains unchanged. After 12 cycles of the MPC channel black, the modulus at 300% has increased 105%, the internal viscosity at 50° C. has decreased by 63% and there is a 100% increase in electrical resistivity.

Figure IX shows the effect obtained on extension modulus when isobutylene-isoprene and carbon black compositions were subjected to heat-mill cycling using the different carbon blacks. Almost no effects are noted in the compositions containing furnace carbon blacks, while startling increases in modulus are noted for the composition containing channel black.

Figure X shows the effect of the heat mill cycling operation on the hysteresis (damping) properties with relation to the type of carbon black employed. The curves show little or no effect of the heat mill treatment on compositions containing furnace black, but an outstanding decrease in the internal viscosity for the composition containing channel black.

EXAMPLE 11

*Effect of mechanical manipulation alone without heat*

Although some relationship between filler dispersion and the extent of mechanical manipulation alone might be suspected, the latter is not a contributing element in the heat cycling process. A batch of polymer with 50 parts of EPC channel black carbon per 100 parts of isobutylene-isoprene copolymer was prepared by "cool" Banbury mixing as in Example 6. Portions of this batch were milled for ½ and 1 hour, respectively, under the same conditions employed during the milling period of the heat-mill cycling process. Sulfur, zinc oxide, and accelerators were then added. The latter operation consumed an additional 5 minutes on the mill and included a portion of untreated batch to serve as the control.

Figure XI shows stress-strain curves for the above prepared compounds when cured for 20 minutes at 307° F. The dashed line represents the behavior which results when a similar batch is heat-mill cycled 12 times. In the latter process, it will be remembered, each heating period is followed by 5 minutes on the mill so that the total milling time is 1 hour.

No change in either absolute damping or electrical resistivity is found when the batch is subjected only to mechanical manipulation as in the experiment described above.

EXAMPLE 12

*Heat-mill cycling with natural rubber*

Heat-mill cycle experiments were carried out with natural rubber. The procedure already described as in Example 10 was employed with the exception that batches of natural rubber were milled at 145° to 155° F. The formulation shown directly below was employed.

| Component: | Parts by weight |
|---|---|
| Natural rubber | [1] 100.0 |
| EPC black | [1] 50.0 |
| Stearic acid | [1] 3.0 |
| Phenyl naphthylamine | [1] 2.5 |
| Zinc oxide | 3.0 |
| Sulfur | 3.0 |
| Mercaptobenzothiazole | 1.0 |

[1] Portions for thermal interaction.

An antioxidant was included with the batch used for attempted thermal interaction to protect the mass during the heat periods. Compounds were cured for 20 minutes at 307° F.

Stress-strain data are detailed in Table 10. Natural rubber appears to be degraded by this treatment, probably due to excessive oxidative attack at the double bonds due to the high unsaturation. Vulcanizates suffer a severe loss in tensile strength and elongation. The effects on tensile strength and extension modulus are plotted in Figures XII(A) and (B).

TABLE 10.—HEAT-MILL CYCLING OF NATURAL RUBBER COMPOSITIONS AND THE EFFECT ON STRESS-STRAIN PROPERTIES

| Polymer | Natural Rubber | | | | |
|---|---|---|---|---|---|
| Number of Heat-Mill Cycles | 0 | 2 | 4 | 8 | 12 |
| Modulus at (#/in.²) | | | | | |
| 100% | 400 | 335 | 260 | 250 | 225 |
| 200% | 1,000 | 875 | 800 | 750 | 750 |
| 300% | 1,875 | 1,837 | 1,685 | 1,810 | 1,765 |
| 400% | 2,885 | 3,075 | 2,810 | | |
| 500% | 4,015 | | | | |
| 600% | | | | | |
| 700% | | | | | |
| Tensile Strength (#/in.²) | 4,015 | 3,840 | 3,225 | 2,850 | 2,750 |
| Percent Elongation | 500 | 480 | 440 | 330 | 370 |

It is obvious that the heat-mill cycling operation has a serious deleterious effect on natural rubber-carbon black compositions.

EXAMPLE 13

*Heat-mill cycling on an industrial scale*

A typical heat cycling experiment was conducted on industrial size equipment. The large scale batch was prepared in a 3A Banbury mixer according to the following formulation:

| | Pounds |
|---|---|
| Isobutylene-isoprene copolymer | 80 |
| MPC channel black | 40 |
| Stearic acid | 0.4 |

The polymer charged initially to the Banbury mixer was homogenized for 2 minutes. Half the carbon black was added initially and the other half 3 minutes later. The batch was dumped after 8 minutes total running time and its temperature was measured at 300° F. Stearic acid was included with the first charge of pigment.

The entire batch was subsequently heat cycled 12 times. Small samples were taken after each second cycle. Half hour heats were conducted in a large autoclave at 310–320° F. At the end of each heat, the batch was milled for 10 minutes on a 60 inch mill.

Samples from this preparation were compounded for vulcanization according to the procedure described in the above examples. Vulcanizates were cured for 20 minutes at 307° F.

Table 11 shows the data which were obtained from this work. The results parallel those obtained from small scale laboratory experiments. The data show that the operation can be done in large equipment as well as in small equipment.

TABLE 11.—HEAT CYCLING APPLIED TO INDUSTRIAL SIZE EQUIPMENT

|  | Control | Heat-Mill Cycled | | | |
| --- | --- | --- | --- | --- | --- |
|  |  | 2 Times | 4 Times | 9 Times | 12 Times |
| Modulus at (#/in.²): | | | | | |
| 100% | 260 | 275 | 270 | 290 | 275 |
| 200% | 425 | 525 | 560 | 650 | 650 |
| 300% | 700 | 900 | 1,025 | 1,200 | 1,220 |
| 400% | 1,025 | 1,425 | 1,600 | 1,860 | 1,940 |
| 500% | 1,550 | 2,010 | 2,150 | 2,460 | 2,540 |
| 600% | 2,160 | 2,625 | 2,760 | 3,000 | 2,950 |
| 700% | 2,650 | | | | |
| Tensile Strength (#/in.²) | 2,730 | 2,890 | 2,895 | 3,000 | 2,950 |
| Percent Elongation | 735 | 670 | 640 | 600 | 600 |
| Damping, $\eta f \times 10^{-6}$ (poises × C. P. S.): | | | | | |
| at 30° C | 14.3 | | | | 9.02 |
| at 50° C | 8.38 | | | | 4.89 |
| at 70° C | 5.16 | | | | 3.01 |

It is noteworthy that a high internal viscosity is associated with the control vulcanizate. This is typical of factory production where mill clearances are wide and control is relatively poor as compared with laboratory procedures and demonstrates the urgent need for the improvement which is made possible by the process of this invention.

EXAMPLE 14

*Static heat treatment*

An experiment was carried out in which the carbon black-polymer composition was heat treated without the mechanical mastication. The following composition was prepared and tested.

| Component: | Parts by weight |
| --- | --- |
| Isobutylene-isoprene copolymer | [1] 100 |
| EPC channel carbon black | [1] 50.0 |
| Stearic acid | [1] 0.5 |
| Zinc oxide | 5.0 |
| Sulfur | 2.0 |
| Tetramethylthiuram disulfide | 1.0 |
| 2,2' benzothiazyldisulfide | 1.0 |

[1] Portions for thermal interaction.

The first three components were mixed together in a Banbury mixer and then homogenized. Portions of this batch were variously treated and then sulfur, zinc oxide, and accelerators were added during 5 minutes on a mill at 80°–90° F. with a clearance between the rolls of 0.040" to 0.045". The final compounds were vulcanized for 20 minutes at 307° F.

Portions of this batch were heated statically in open steam at 310° F. for 1, 2, 3, 5, and 7 hours, respectively. A control which had no treatment of the batch prior to the addition of the vulcanization additives was also included in the series. Figure XIII shows the stress-strain data given by the resulting vulcanizates. Stress increases rapidly during the first hour of heat treatment at this temperature. A maximum or limiting time appears in about five hours for this temperature and substantially no change was found when heating was extended to seven hours.

The final stress-strain curve obtained is substantially the same as the curve obtained when a sample had been heat-mill cycled 12 times. The curve showing the latter is indicated in Figure XIII as a dashed line.

EXAMPLE 15

*The effect of temperature on static heat treatment*

Example 14 was repeated except that the temperature of the thermal treatment was reduced to 220° F.

The data obtained are plotted in Figure XIV showing extension modulus values for the systems heated at 220° F. and 310° F. The increase in modulus which results from heating at 220° F. is quite small during the first five hours. After this period of time, the stress growth is more rapid. These data show the close relationship which exists between the temperature at which polymer-carbon black is heated and the period of time during which the heating takes place.

EXAMPLE 16

*Dynamic heat treatment in the Banbury mixer*

The following batch was mixed in the Banbury mixer under "cool" conditions:

| | Gms. |
| --- | --- |
| Isobutylene-isoprene copolymer | 1700.0 |
| MPC channel black | 850.0 |
| Stearic acid | 8.5 |

The dump temperature of the batch was 265° F. The mixture was sheeted off on an open mill and returned to the Banbury, heated internally with 95# of steam. The mass was agitated continuously in the Banbury mixer under these conditions for 35 minutes. After dumping, the batch was sheeted on an open mill again and allowed to rest for 48 hours. It was returned to the Banbury at the end of this time and given another 35 minutes of agitation under heat conditions. The stock temperature during the hot Banbury treatments was recorded automatically on a micromax connected with a thermocouple projecting into the mixing chamber. The heat histories for the first and second hot Banbury runs of the batch above are given in Figure XV.

In a given composition of polymer and carbon black, the viscosity of the mass decreases as the dispersion of the carbon black is improved. After the conventional cool mixing operation, the batch was dry feeling, stiff, and tough. In the hot Banbury, it built up heat rapidly and very soon reached a maximum temperature of about 430° F.

This high temperature resulted as the energy which was required to work the mass became converted, through friction, into heat. The appearance of the batch, after cooling from the first Banbury treatment, was very noticeably changed by the treatment. The dryness and toughness were gone. The stock was shiny, tacky, and soft and when it was returned to the hot Banbury for the second run, the rise in temperature was much more slow than in the first run. Peak temperature in this case was very close to 390° F.

Samples of the batch were taken after the original or conventional mixing and after each of the hot Banbury mixing runs. These were compounded for vulcanization according to the following recipe:

| Component: | Parts by weight |
| --- | --- |
| Polymer | 100.0 |
| MPC channel carbon black | 50.0 |
| Stearic acid | 0.5 |
| Sulfur | 2.0 |
| Tetramethylthiuram disulfide | 1.0 |
| 2,2'-benzothiazyl disulfide | 1.0 |

This mixing operation was performed on a 6"×12" mill in 5 minutes. The mill was maintained at 80°–90° F. and set for 0.040–0.045" clearing between the rolls.

Vulcanizates of the three batches were prepared by curing specimens for 20 minutes at 307° F.

The results which were obtained from testing the three vulcanizates involved in this experiment are recorded in Table 12.

TABLE 12.—EFFECT OF HOT BANBURY TREATMENT ON VULCANIZATE QUALITY

|  | Conventional or Cool Mixing | 1st Banbury Heating | 2nd Banbury Heating |
|---|---|---|---|
| Modulus at (#/in.²): |  |  |  |
| 100% | 225 | 225 | 225 |
| 200% | 475 | 560 | 650 |
| 300% | 850 | 1,225 | 1,375 |
| 400% | 1,350 | 1,950 | 2,140 |
| 500% | 2,000 | 2,625 | 2,825 |
| 600% | 2,725 |  |  |
| Tensile Strength (#/in.²) | 3,250 | 3,125 | 3,110 |
| Percent Elongation | 690 | 590 | 570 |
| Damping, $\eta f \times 10^{-6}$ (poises $\times$ C. P. S.): |  |  |  |
| at 30° C | 7.85 | 4.23 | 3.77 |
| at 50° C | 4.98 | 2.41 | 2.17 |
| at 70° C | 3.45 | 1.63 | 1.50 |
| Specific Resistivity (ohm. cm.) | $4.62 \times 10^7$ | $2.40 \times 10^8$ | $2.14 \times 10^{11}$ |

It can thus be seen that the vulcanizate quality is greatly improved when the copolymer-channel black mixture is hot Banbury treated prior to the addition of vulcanizing agents. The results are similar and comparable to those obtained with the heat-mill cycle process. The modulus of extension is greatly increased by the hot Banbury operation. Tensile strength remains substantially the same. Resilience is increased as evidenced by the sharp decline in the internal viscosity which is obtained from vulcanizates prepared from the heat treated batches. The increase in electrical resistivity indicates that the hot Banbury treatment leads to improved dispersion conditions.

EXAMPLE 17

*Dynamic heat treatment in the Banbury mixer using natural rubber*

The experiment of Example 16 was repeated with natural rubber instead of the copolymer. Only one Banbury heat treatment was employed. The batch was stabilized with phenyl-β-naphthylamine to prevent excessive oxidation.

The following batch was mixed under "cool" conditions in the Banbury mixer.

|  | Gms. |
|---|---|
| Natural rubber | 1700.0 |
| EPC channel black | 850.0 |
| Stearic acid | 51.0 |
| Phenyl-β-naphthylamine | 42.5 |

In the hot Banbury (95# of steam internally) the mixture was agitated continuously for 30 minutes.

Portions of the natural rubber composition, both before and after hot Banbury treatment, were compounded for vulcanization according to the following recipes:

| | |
|---|---|
| Natural rubber | ¹ 100.0 |
| EPC channel black | ¹ 50.0 |
| Stearic acid | ¹ 3.0 |
| Phenyl-β-naphthylamine | ¹ 2.5 |
| Zinc oxide | 3.0 |
| Sulfur | 3.0 |
| Mercaptobenzothiazole | 1.0 |

¹ Portions for thermal interaction.

The procedure employed was like that described in Example 16. Vulcanizates were prepared by curing the compounds of the above recipe for 40 minutes at 307° F.

The results which were obtained from testing the vulcanizates obtained from these experiments are summarized in Table 13.

TABLE 13.—EFFECT OF HOT BANBURY TREATMENT ON NATURAL RUBBER

|  | Conventional or Cool Mixing | Hot Banbury Mixing |
|---|---|---|
| Modulus at (#/in.²): |  |  |
| 100% | 350 | 250 |
| 200% | 825 | 775 |
| 300% | 1,625 | 1,700 |
| 400% | 2,600 |  |
| 500% | 3,725 |  |
| Tensile Strength (#/in.²) | 3,900 | 2,725 |
| Percent Elongation | 510 | 380 |
| Damping, $\eta f \times 10^{-6}$ (poises $\times$ C. P. S.): |  |  |
| at 30° C |  |  |
| at 50° C |  |  |
| at 70° C | 2.34 | 1.66 |
| Specific Resistivity (ohm. cm.) | $1.17 \times 10^8$ | $>10^{14}$ |

The data in Table 13 indicate that polymer compositions of natural rubber cannot be successfully employed in the hot Banbury process. Although the natural rubber compound becomes more resilient, its tensile strength is decreased by more than 1000 pounds. The fact that electrical resistivity increases in the natural rubber polymer system probably indicates that the dispersion of pigment is improved by the heat treatment, but this improvement is much more than offset by the severe oxidative attack on the rubber itself.

EXAMPLE 18

*Dynamic heat treatment on an industrial scale*

A number of larger scale operations employing factory size equipment were carried out with the dynamic heat treatment process using the Banbury mixer.

The following batch was prepared in a large Banbury mixer under "cool" conditions:

| | |
|---|---|
| Isobutylene-isoprene copolymer | lbs 63.5 |
| MPC channel black | lbs 36.5 |
| Stearic acid | gms 167 |

The temperature of the batch on dumping was found to be 220° F. The stock was cut several times on the take-off mill, sheeted, and then allowed to rest for 20 hours. The Banbury mixer was run without cooling water but no internal steam heat was employed. The batch, which was dumped after 20 minutes of agitation, had reached a temperature of 470° F.

Samples were compounded for vulcanization according to the following recipe:

| Component: | Parts by weight |
|---|---|
| Isobutylene-isoprene copolymer | ¹ 100.0 |
| MPC channel black | ¹ 50.0 |
| Stearic acid | ¹ 0.5 |
| Sulfur | 2.0 |
| Tetramethylthiuram disulfide | 1.0 |
| 2,2'-benzothiazyl disulfide | 1.0 |
| Zinc oxide | 5.0 |

¹ Portions for thermal interaction.

Samples of 301.0 gms. of the batch were used to make up the recipe. The operation was completed in 5 minutes on an open mill at 80°–90° F. with a clearance of 0.040" to 0.045" between the rolls. Vulcanizates were prepared by molding for 20 minutes at 307° F.

The data which were collected from these samples proved that the process is readily adaptable to large scale production and gives products which have reduced internal viscosity and good tensile strength and modulus values. They are summarized in Table 14.

TABLE 14.—INDUSTRIAL SCALE OPERATION OF THE HOT BANBURY PROCESS

|  | Conventional or Cool Mixing | Hot Banbury Treatment |
|---|---|---|
| Modulus at (#/in.²): | | |
| 100% | 250 | 270 |
| 200% | 460 | 570 |
| 300% | 790 | 1,120 |
| 400% | 1,210 | 1,780 |
| 500% | 1,770 | 2,470 |
| 600% | 2,465 | 3,010 |
| Tensile Strength (#/in.²) | 3,120 | 3,130 |
| Percent Elongation | 710 | 625 |
| Damping, $\eta f \times 10^{-6}$ (poises × C. P. S.) at 50° C. | 4.40 | 3.23 |

EXAMPLE 19

*Effect of varying carbon content*

In two series of comparative tests, the quantity of oxy-carbon black was varied in 10 part steps from 20 parts per 100 of the isobutylene-isoprene copolymer to 70 parts per 100 of the copolymer. One series of these samples was static heat treated for 6 hours at 320° without mechanical agitation, while the second series was not so treated. Thereafter, samples were cured for 45 minutes at 307° F. and the samples were tested to obtain comparative stress-strain and damping data. The heat treated series of samples showed increased modulus, and the percent increase over the untreated control samples was regularly greater as the amount of carbon black was increased. The increase in modulus values was 20% greater for the samples containing 20 parts of carbon and 70% greater for the samples containing 70 parts of carbon. The tensile strengths were equal or greater for the heat treated samples in comparison to the tensile strengths of the controls.

The internal viscosities were determined and were found to be lower for the heat treated samples, all these samples showing increasingly greater reductions in the internal viscosity with the content of black up to 40 parts per 100 parts of polymer, and thereafter remaining constant at about 45% decrease in internal viscosity over the control samples.

EXAMPLE 20

*Dilution technique*

Two large batches of isobutylene-isoprene copolymer and oxy-carbon black (MPC) were made up containing 70 parts by weight of oxy-carbon black per 100 parts by weight of copolymer. One of these batches was heat treated 6 hours at 320° F. and the other batch to be used as a control was not so treated. A series of samples was made from each of the above batches by adding varying quantities of the original copolymer so that the carbon black content of the resulting samples varied in 10 part steps from 20 to 70 parts by weight. Thus these samples corresponded in carbon content to the samples of the previous example. Each sample was prepared for vulcanization and was cured for 45 minutes at 307° F. The stress-strain properties of these vulcanizates, both from control and preheated batches, were the same as those of the comparable vulcanizates in the previous Example 19. The internal viscosity relations of these diluted samples corresponded roughly to those of the previous example except that the internal viscosities of the heat treated samples was decreased even more with this masterbatch-dilution technique than with the straight forward mixes as in Example 19. This indicates that an economical type of "dilution" operation is practical and useful for this novel heat treating method.

What is claimed is:

1. A process which comprises mixing about 20 to 200 parts by weight of an oxy-carbon black with about 100 parts by weight of a low unsaturation rubbery isoolefin-multiolefin synthetic copolymer having a Staudinger molecular weight between about 20,000 and 200,000 and a Wijs iodine number of about 1 to 50 and heating the mixture formed, in the absence of agents effecting vulcanization during said heating, to a temperature level at least within the range of between about 250–450° F., but below the decomposition temperature of the copolymer for a time of about 10 minutes to 7 hours, said time corresponding approximately to about 1 to 7 hours at a temperature of about 250° F. without agitation and about 10 minutes to 1 hour at a temperature of about 450° F. with agitation, and until the internal viscosity is decreased between about 20 and 60%, whereby the physical properties of the resulting mixture after curing are improved.

2. A process according to claim 1 in which the oxy-carbon black is a channel black containing combined oxygen.

3. Process according to claim 1 in which the oxy-carbon black is an oxidized carbon black.

4. Process according to claim 1 in which the heating is accompanied by agitation.

5. A process which comprises mixing about 20 to 100 parts by weight of an oxy-carbon black with about 100 parts by weight of a rubbery copolymer of a $C_4$-$C_8$ isoolefin and a $C_4$-$C_8$ multiolefin, said copolymer having a Staudinger molecular weight between about 20,000 and 200,000 and an iodine number of between about 1 to 50 and heating the mixture formed to a temperature level at least within the range of between 250°–450° F. but below the decomposition temperature of the copolymer, said mixture during heating containing at least one vulcanizing agent in an amount of not more than 5.0% based on copolymer, said amount being insufficient to cure the copolymer during said heating, said heating being, for an inversely extended period of time, corresponding approximately to about 1 to 7 hours at about 250° F. without agitation, to about 10 minutes to 1 hour at about 450° F. with agitation, until upon subsequent vulcanization the modulus of the cured copolymer at an elongation of 300% increases between about 25 and 150%, the internal viscosity is decreased about 20 to 60% and there is produced a vulcanizable composition containing at least about 15% non-reversibly bound rubber, said composition, upon subsequent vulcanization, exhibiting a combination of decreased stiffness and increased resistance to stretching compared to the same composition which, prior to vulcanization, was substantially free of bound rubber.

6. A process for converting rubbery synthetic copolymers into compositions which when vulcanized, exhibit improved characteristics, which comprises heating, in the absence of agents effecting vulcanization during said heating, a mixture of about 100 parts by weight of a copolymer of a $C_4$-$C_8$ isoolefin and a multiolefin selected from the group consisting of isoprene and butadiene, said copolymer having a Staudinger molecular weight between about 20,000 and 100,000 and an iodine number of between about 1 and 50, with about 20 to 200 parts by weight of an oxy-carbon black to an elevated temperature of about 250 to 470° F., for a time of between about 10 minutes and 7 hours, corresponding approximately to about 1 to 7 hours at about 250° F. without agitation and about 10 minutes to 1 hour at about 450° F. with agitation, until the damping of the resulting copolymer containing composition when cured is decreased between about 20 and 80% whereby the physical properties of said cured resulting copolymer containing composition are improved.

7. A process for producing cured isoolefin-multiolefin synthetic rubbers having improved physical properties and being especially suitable for tire and tire tread stocks, which comprises heating a mixture consisting essentially of about 20 to 200 parts by weight of an oxy-carbon black and about 100 parts by weight of a low unsaturation vulcanizable copolymer of a major proportion of a $C_4$–$C_8$ isoolefin and a minor proportion of a $C_4$–$C_8$ multiolefin, said copolymer having a Staudinger molecular weight of between about 20,000 and 200,000 and an iodine number between about 1 and 50, to an elevated temperature above about 250° F., but below the decomposition temperature of the copolymer for an inversely extended period of time, corresponding approximately to about 1 to 7 hours at about 250° F. without agitation, and for 10 minutes to 1 hour at about 450° F. with agitation, until the internal viscosity of the resulting composition is decreased by an amount of at least within the range of between about 20 and 60% and the resistivity is increased between about 1,000 and 100 million ohm-cms., and thereafter adding at least one vulcanizing agent and effecting vulcanization.

8. A process for fabricating vulcanized rubbery copolymers of improved physical properties, suitable for tire and tire tread stocks which comprises admixing about 0.1 to 5.0% but a non-vulcanizing amount of a vulcanizing agent with a oxy-carbon containing compound and an isoolefin-multiolefin rubbery copolymer having a Staudinger molecular weight between about 20,000 to 200,000 and an iodine number of between about 1 and 50, the mixture formed containing about 20 to 200 parts by weight of said oxy-carbon containing compound per 100 parts by weight of said copolymer, heating said mixture formed to a temperature of at least about 250° F., but below the decomposition temperature of said copolymer for an inversely extended period of time of about 10 minutes to 7 hours, corresponding approximately to about 1 to 7 hours at about 250° F. without agitation, and about 10 minutes to 1 hour at about 450° F. with agitation, until the resulting vulcanizable composition when subsequently vulcanized has an increased modulus at 300% elongation of between about 25 and 150%, a decreased internal viscosity between about 20 and 60% and contains at least about 15% non-reversibly bound rubber to said oxy-carbon containing compound, and subsequently subjecting said resulting mixture to forming operations and vulcanization by heat in the presence of vulcanizing amounts of at least one added curing agent so as to produce a vulcanized composition exhibiting a combination of decreased stiffness and increased resistance to stretching compared to the same composition which, prior to vulcanization, was substantially free of bound rubber.

9. A vulcanizable composition of matter comprising about 100 parts by weight of a rubbery vulcanizable copolymer of an isoolefin containing between about 4 to 14 carbon atoms and a multiolefin containing between about 4 to 14 carbon atoms, having a Staudinger molecular weight between about 20,000 to 200,000 and an iodine number between about 1 and 50, 100 parts by weight of said copolymer being combined with about 20 to 200 parts by weight of an oxy-carbon black, forming a vulcanizable composition containing at least about 15% non-reversibly bound rubber, said composition, containing at least one vulcanizing agent in an amount of not more than 5.0% based on copolymer, said amount being insufficient to cure the copolymer, said composition, upon subsequent vulcanization, exhibiting an increase in modulus at 300% elongation of between about 25 and 150%, a decrease in internal viscosity of about 20 to 60% and a combination of decreased stiffness and increased resistance to stretching compared to the same composition which, prior to vulcanization, was substantially free of bound rubber.

10. A composition according to claim 9 in which the oxy-carbon black is a channel black containing combined oxygen.

11. A composition according to claim 9 in which the oxy-carbon black is an oxidized furnace black.

12. A composition according to claim 9 which, when cured, has an increased resistivity of between about 1,000 and 100,000,000 ohm-cm., compared to the same composition containing no bound rubber.

13. A composition according to claim 9 in which the isoolefin is isobutylene, the multiolefin being conjugated; said composition, when cured, having an increased modulus at 300% elongation of between about 25 and 150% compared to the same composition containing no bound rubber.

14. A composition according to claim 9 in which the isoolefin is isobutylene, the multiolefin being selected from the group consisting of isoprene and butadiene; said composition, when cured, having an increased tensile strength between about 10 and 75% compared to the same composition containing no bound rubber.

15. A composition according to claim 9 in which the isoolefin is isobutylene, said composition having an increased resistivity of between about 1,000 and 100,000,000 ohm-cms. and an increased modulus at 300% elongation at least within the range of between about 25 and 150% compared to the same cured composition containing, prior to vulcanization, no bound rubber.

16. A vulcanized composition of matter according to claim 9.

17. A composition according to claim 16 in which the multiolefin is isoprene, the oxy-carbon black being a channel black.

18. A process for converting isoolefin-multiolefin copolymers into vulcanizable compositions of improved characteristics which comprises heating, in the absence of agents in an amount sufficient to cure the copolymer during said heating, said amount being not more than about 1.0% based on copolymer, a mixture of about 100 parts by weight of a copolymer of isobutylene and a $C_4$–$C_{14}$ multiolefin having a Staudinger molecular weight between about 20,000 and 200,000 and an iodine number of about 1 to 50 with about 20 to 200 parts by weight of an oxy-carbon black to an elevated temperature of between about 250° and 470° F. for an inversely extended period of time corresponding approximately to between about 1 to 7 hours at about 250° F. without agitation and about 10 minutes to 1 hour at about 450° F. with agitation, until the resulting vulcanizable composition contains at least 15% non-reversibly bound rubber and the internal viscosity of the resulting copolymer containing composition when subsequently vulcanized is decreased about 20 to 60%, the modulus at 300% elongation is increased by an amount at least within the range of between about 25 and 150% and there is produced a composition which, when vulcanized, exhibits a combination of decreased stiffness and increased resistance to stretching compared to the same composition, which prior to vulcanization, was substantially free of bound rubber.

References Cited in the file of this patent

UNITED STATES PATENTS

| | | |
|---|---|---|
| 2,118,601 | Gerke et al. | May 24, 1938 |
| 2,395,778 | Breck et al. | Feb. 26, 1946 |
| 2,526,504 | Rehner et al. | Oct. 17, 1950 |

OTHER REFERENCES

Dannenberg et al.: Ind. & Eng. Chem., volume 41, pages 1607–1616, August 1949.

Drogin: India Rubber World, volume 106, pages 561–569, September 1942.

Winn et al.: Ind. & Eng. Chem., volume 38, pages 1052–6, October 1946.